(12) United States Patent
Drumheller

(10) Patent No.: US 6,791,470 B1
(45) Date of Patent: Sep. 14, 2004

(54) REDUCING INJECTION LOSS IN DRILL STRINGS

(75) Inventor: Douglas S. Drumheller, Cedar Crest, NM (US)

(73) Assignee: Sandia Corporation, Albuquerque, NM (US)

(*) Notice: Subject to any disclaimer, the term of this patent is extended or adjusted under 35 U.S.C. 154(b) by 684 days.

(21) Appl. No.: 09/872,907

(22) Filed: Jun. 1, 2001

(51) Int. Cl.[7] ............................................. G01V 3/00
(52) U.S. Cl. ........................... 340/854.4; 340/855.7; 367/81; 367/82; 181/139
(58) Field of Search ..................... 340/854.4, 855.7; 367/81, 82; 181/139

(56) References Cited

U.S. PATENT DOCUMENTS

| | | | |
|---|---|---|---|
| 3,252,225 A | | 5/1966 | Hixson |
| 4,001,773 A | * | 1/1977 | Lamel et al. ............... 367/82 |
| 5,056,067 A | | 10/1991 | Drumheller |
| 5,128,901 A | | 7/1992 | Drumheller |
| 5,166,908 A | * | 11/1992 | Montgomery ............... 367/165 |
| 5,222,049 A | | 6/1993 | Drumheller |
| 5,477,505 A | | 12/1995 | Drumheller |
| 5,592,438 A | * | 1/1997 | Rorden et al. ............... 367/83 |
| 5,703,836 A | | 12/1997 | Drumheller |
| 6,108,268 A | * | 8/2000 | Moss ............... 367/82 |
| 6,147,932 A | | 11/2000 | Drumheller |
| 6,188,647 B1 | | 2/2001 | Drumheller |
| 6,545,458 B2 | * | 4/2003 | Yamazaki ............... 324/158.1 |

OTHER PUBLICATIONS

Barnes, T.G., et al., "Passbands for Acoustic Transmission in an Idealized Drill String," *J. of Acoustical Soc Of Amer.*, vol. 51, No. 5 (part 2), pp 1606–1608 (1972).

Brillouin, L., Wave Propagation in Periodic Structures—Electric Filters and Crystal Lattices, Textbook, 2$^{nd}$ Ed. (1946), Dover Publications.

Drumheller, D.S., "Extensional Stress Waves in One–Dimentional Elastic Waveguides," *Acoustical Soc of Amer.*, vol. 92, No. 6, pp 3389–3401 (Dec. 1992).

Drumheller, D.S., "Propagation of Sound Waves in Drill Strings," *Acoustical Soc of Amer.*, vol. 97, No. 65 pp 2116–2125 (Apr. 1995).

Drumheller, D.S., "Introduction to Wave Propagation in Nonlinear Fluids and Solids," Textbook, pp105–107, Cambridge University Press (1998).

(List continued on next page.)

*Primary Examiner*—Timothy Edwards
(74) *Attorney, Agent, or Firm*—Jeffrey D. Myers; Peacock, Myers & Adams PC

(57) ABSTRACT

A system and method for transferring wave energy into or out of a periodic structure having a characteristic wave impedance profile at a prime frequency, the characteristic wave impedance profile comprising a real portion and an imaginary portion, comprising: locating one or more energy transfer elements each having a wave impedance at the prime frequency approximately equal to the real portion of the characteristic wave impedance at one or more points on the periodic structure with the imaginary portion approximately equaling zero; and employing the one or more energy transfer elements to transfer wave energy into or out of the periodic structure. The energy transfer may be repeaters. Quarter-wave transformers can be provided at one or more points on the periodic structure with the imaginary portion approximately equaling zero to transmit waves across one or more discontinuities. A terminator can be employed for cancellation of waves. The invention substantially eliminates reflections of the wave energy at the prime frequency by joints between sections of the periodic structure.

40 Claims, 16 Drawing Sheets

OTHER PUBLICATIONS

Drumheller, D.S., "Attenuation of Sound Waves in Drill Strings," *J. Acoustical Soc of Amer.*, vol. 94, No. 4, pp 2387–2396 (Oct. 1993).

Drumheller, D.S., "Acoustical Properties of Drill Strings," *J. Acoustical Soc of Amer.*, vol. 85, No. 3, pp 1048–1064 (Mar. 1989).

Hamming, R.W., "Digital Filters" Textbook, Second Edition, Prentice–Hall, Inc. (1997, 1983), pp 4–5.

Kino, G.S., "Acoustic Waves: Devices, Imaging, and Analog Signal Processing," Textbook, Prentice–Hall, Inc., (1987) p. 9.

* cited by examiner

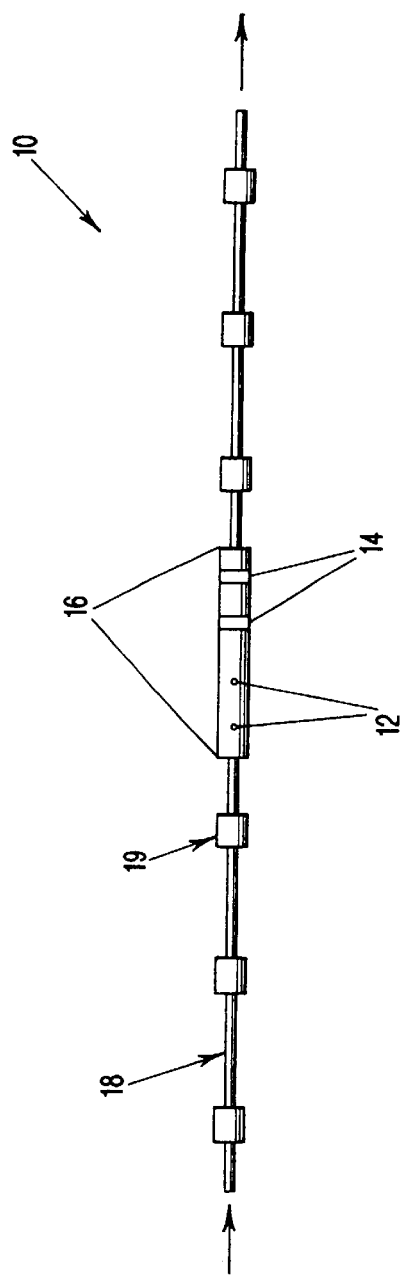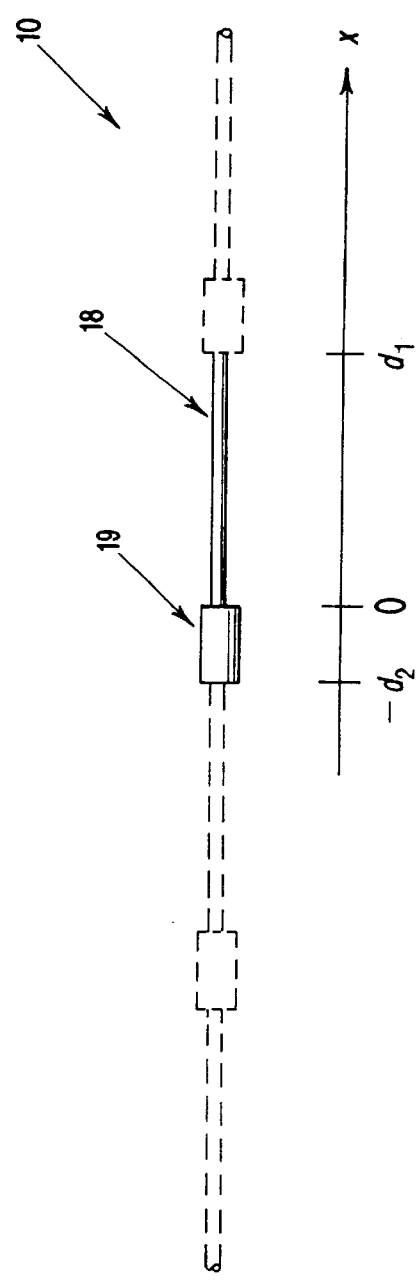

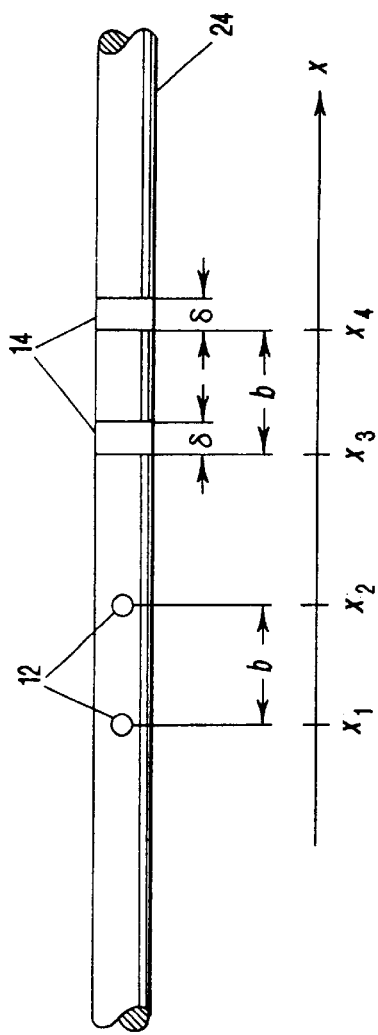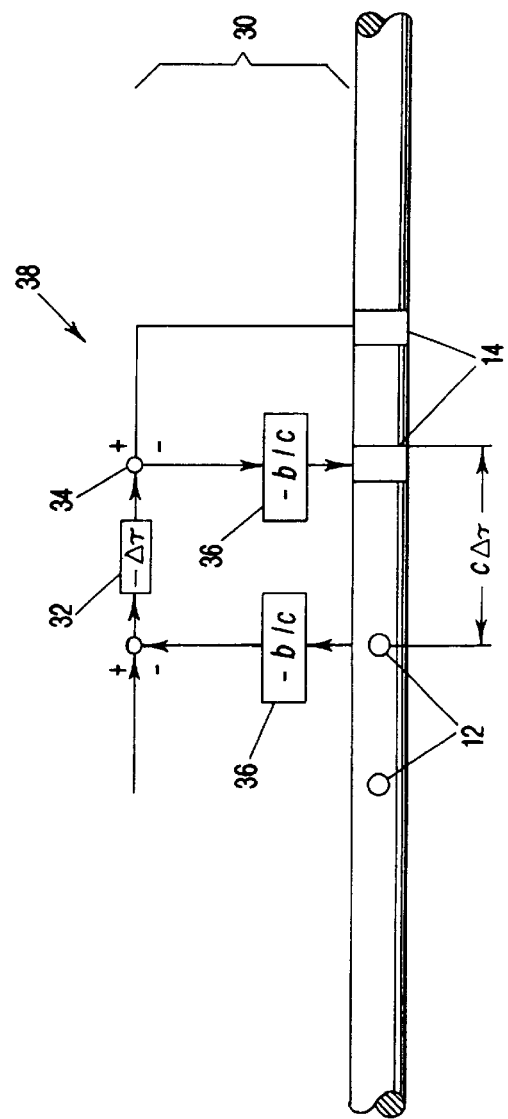
FIG-17
FIG-18

US 6,791,470 B1

REDUCING INJECTION LOSS IN DRILL STRINGS

GOVERNMENT RIGHTS

The Government has rights to this invention pursuant to Contract No. DE-AC04-94AL85000 awarded by the U.S. Department of Energy.

BACKGROUND OF THE INVENTION

1. Field of the Invention (Technical Field)

The present invention relates to methods and apparatuses for down-hole communications via drill strings.

2. Background Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

It is known in the art to communicate through drill strings so that the drill operator at the surface might understand what is happening underground miles away at the drill bit. Stress waves are created in the drill string and data are modulated on them. These waves then use the drill string as a wave guide and carry the data up and down the well. Unfortunately, the communication range is limited by unwanted wave reflections at the joints between various components of the drilling system as well as the various components of the communication system itself. The present invention provides a way to eliminate these reflections and extend the range indefinitely. It is commonly known that wave reflections are caused by changes in the physical parameter called wave impedance. All components in a drill string and all components in a drill-string communication system have a wave impedance.

For example, the instruments and transmitters in a drill-string communication system are housed in cylindrical enclosures and the wave impedance of a uniform cylinder is equal to the algebraic product of the material density, sound speed, and cross-sectional area of the enclosure. If the individual wave impedances of these various components are matched then the wave reflections between them are eliminated. However, the impedance of a drill string is a complex number, while those of the communication devices are real numbers. In general a real number cannot be made to equal a complex number, and thus it appears that it is impossible to impedance match the communication system to the drill string. However, the present invention takes advantage of the discovery that the impedance at certain physical locations along the length of each and every piece of drill pipe in the drill string is also real. At these points, the impedance of the communication devices can be matched to the drill string.

SUMMARY OF THE INVENTION (DISCLOSURE OF THE INVENTION)

The present invention is of a system and method for transferring wave energy into or out of a periodic structure having a characteristic wave impedance profile at a prime frequency, the characteristic wave impedance profile comprising a real portion and an imaginary portion, comprising: locating one or more energy transfer elements each having a wave impedance at the prime frequency approximately equal to the real portion of the characteristic wave impedance at one or more points on the periodic structure with the imaginary portion approximately equaling zero; and employing the one or more energy transfer elements to transfer wave energy into or out of the periodic structure. In the preferred embodiment, the periodic structure comprises a drill string comprising a plurality of sections of drill pipe of approximately equal length and a plurality of sections of tool-joint connections of approximately equal length. The one or more energy transfer elements preferably comprise one or more repeaters. Each of the one or more energy transfer elements is preferably located approximately at a longitudinal midpoint of a section of drill pipe or tool joint connection, although other points with real impedances will also work. One or more quarter-wave transformers can be provided at one or more points on the periodic structure with the imaginary portion approximately equaling zero to transmit waves across one or more discontinuities in the drill string. As one way to match the impedances, each of the one or more energy transfer elements comprises a cross-sectional area approximately equal to the real portion divided by a product of a mass density and a speed of sound of the energy transfer element. A terminator can be employed for cancellation of waves in the periodic structure. The invention substantially eliminates reflections of the wave energy at the prime frequency by joints between sections of the periodic structure. The periodic structure can not only be a drill string, but also any of optical structures, laminated slabs, semiconductor chips, coated lenses, pipes, and geologic formations.

The present invention is also of a stress wave communication system and method comprising: in a periodic structure transmitting stress waves at a communications frequency; and employing a terminator comprising an amplifier having a gain of negative one at the communications frequency. In the preferred embodiment, the periodic structure comprises a drill string comprising a plurality of sections of drill pipe and a plurality of sections of tool-joint connections. The terminator preferably employs a filter to remove frequencies higher than a predetermined frequency above the communications frequency, the filter located between an accelerometer array and a transmitter array.

The present invention is additionally of a stress wave communication system and method comprising: providing a periodic structure having a characteristic wave impedance profile at a communications frequency, the characteristic wave impedance profile comprising a real portion and an imaginary portion; and employing a quarter-wave transformer having an impedance approximately equal to a square root of a product of an impedance of a member connected to the periodic structure at the communications frequency and the real portion at a point at which the imaginary portion approximately equals zero. In the preferred embodiment, the periodic structure comprises one or more drill strings each comprising a plurality of sections of drill pipe of approximately equal length and a plurality of sections of tool-joint connections of approximately equal length. The transformer preferably has a slower wave speed than the periodic structure.

The invention is further of a stress wave communication system and method comprising: providing a periodic structure for transmitting stress waves at a communications frequency and having a characteristic wave impedance profile at the communications frequency, the characteristic wave impedance profile comprising a real portion and an imaginary portion; and employing one or more repeaters each having a wave impedance at the communications frequency approximately equal to the real portion of the characteristic wave impedance at one or more points on the periodic structure with the imaginary portion approximately equaling zero. In the preferred embodiment, the periodic structure comprises a drill string comprising a plurality of sections of drill pipe of approximately equal length and a plurality of sections of tool-joint connections of approximately equal length. Each of the one or more repeaters is preferably located approximately at a longitudinal midpoint of a section of drill pipe or tool joint connection, although other points with real impedances will also work. Each of the one or more repeaters preferably comprises a cross-sectional area approximately equal to the real portion divided by a product of a mass density and a speed of sound of the repeaters.

The invention is still further of a method of inserting wave energy into a periodic structure comprising: determining a point in a periodic structure having a characteristic wave impedance profile at a communications frequency, the characteristic wave impedance profile comprising a real portion and an imaginary portion, which point has an imaginary portion approximately equaling zero; matching impedance of a wave energy insertion elements to the real portion at said point; and inserting at the point via the wave energy insertion elements wave energy at the communications frequency; and whereby reflections of the wave energy by the periodic structure are substantially minimized. In the preferred embodiment, the periodic structure comprises any of optical structures, laminated slabs, semiconductor chips, coated lenses, pipes, geologic formations, and drill strings.

A primary object of the present invention is to provide a communications method and apparatus functional over a drill string of any length.

A primary advantage of the present invention is its extensibility to other periodic structures.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 1 is a schematic diagram of a repeater of the invention mounted in a drill string;

FIG. 2 illustrates the preferred coordinate system of the invention for drill pipe;

FIG. 17 is a schematic of transducer arrays in an infinite rod; and

FIG. 18 is a schematic of the terminator circuit of the invention.

Figure 3:
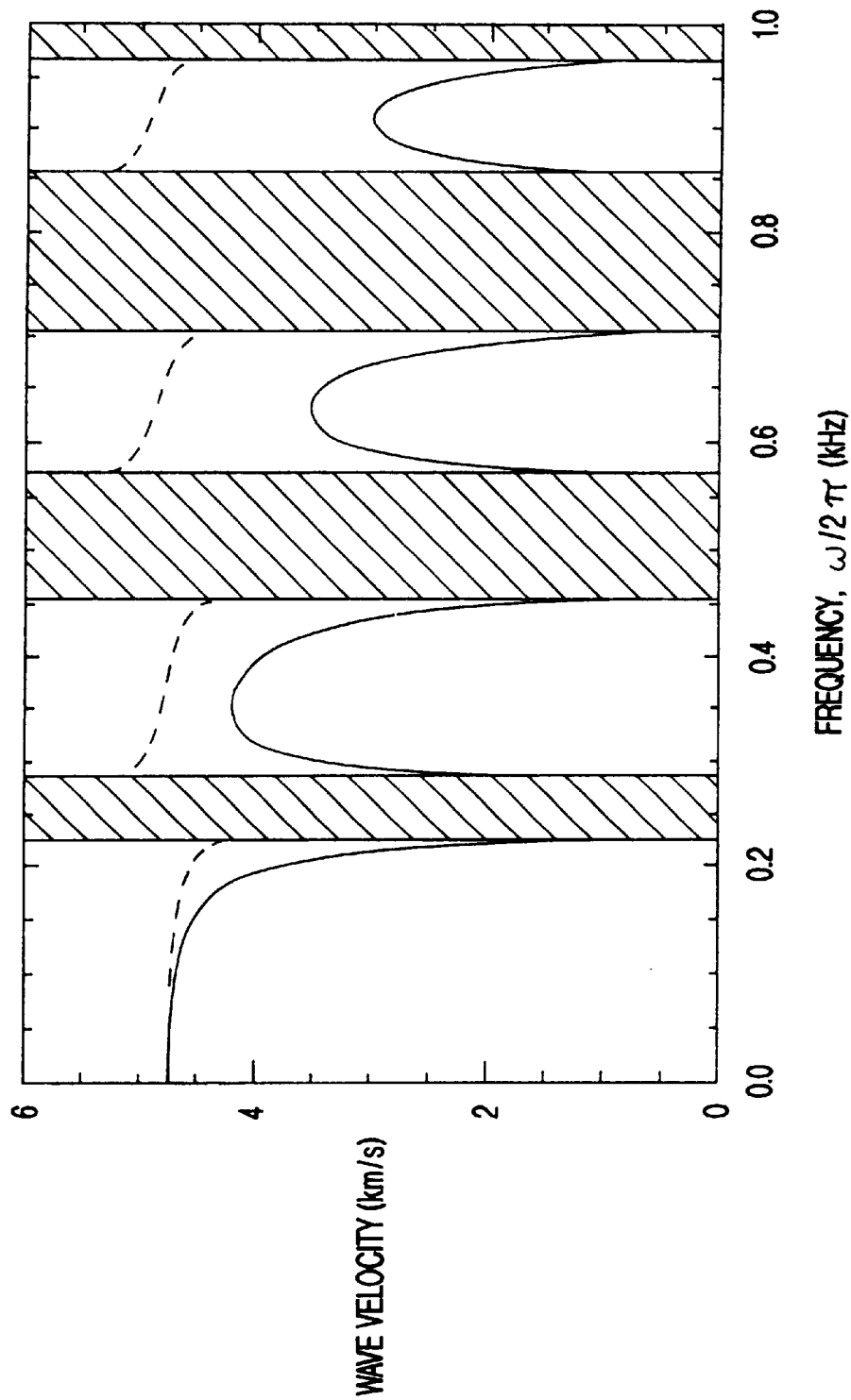
FIG. 3 is a graph of passbands and stopbands of drill pipe; the group velocity (—) and the phase velocity (- - -) are illustrated within the passbands.

DESCRIPTION OF THE PREFERRED EMBODIMENTS (BEST MODES FOR CARRYING OUT THE INVENTION)

The present invention is of methods and apparatuses enabled by the discovery that the impedance at certain physical locations along the length of each and every piece of drill pipe in a drill string is also real, as opposed to complex (real plus imaginary). At these points, the impedance of the communication devices can be match ed to the drill string by: (1) joining a communication device to one of two or more particular points on any section of drill pipe; and (2) ensuring that the cross-sectional area of the device equals a particular computed value.

A first embodiment of the present invention is a method and apparatus for extending the range of a repeater. Consider that repeaters can be used to intercept weak messages and rebroadcast them as strong messages. If repeaters of sufficient range, say 5000 feet, can be built, then the overall range of communications can be extended indefinitely. However, at first it appears that half the strength of the repeater signal will be used to just get the communication signal out of one repeater and into the drill string and then out of the drill string and back into the next repeater. That is often referred to as "injection loss". Following the two steps listed above, the injection losses can be eliminated by matching the wave impedance of the repeater to that of the drill string. This roughly doubles the transmission range of the repeater.

A second embodiment of the present invention is of a method and apparatus for canceling waves in a drill string, referred to herein as a "terminator". A prior terminator known in the art works only in a uniform rod of constant diameter, i.e., not in a drill string or other periodic structure.

U.S. Pat. Nos. 5,128,901 and 5,056,067, to Drumheller. Via the terminator, one can get the signal out of the drill string and into the terminator where it can be canceled. Directional control and cancelation of waves in the drill string are nearly as important as actually creating the communication signal in the first place.

A third embodiment of the present invention is of a method and apparatus for communicating across major discontinuities in the drill string. Typically two types of tubulars are used in the drill string. The lower section contains drill collar and the upper section contains drill pipe. The junction between these sections causes a wave reflection. Hixson discusses this in U.S. Pat. No. 3,252,225. He describes a method, called a "quarter-wave transformer", to eliminate these reflections, but the method does not work at the communication frequencies currently employed in the industry. The present invention shows how to precisely define dimensions to eliminate wave reflections between the drill collar and the drill pipe, and indeed to eliminate wave reflections between all other components of the drilling assembly. The transformer of the invention allows one to join a repeater of any cross-sectional area to any type of drill string.

The present invention is based upon a quite general analysis of wave phenomena. Optical and X-ray scattering, for example, exhibit similar phenomena albeit at much higher frequencies. All of these phenomena fall under the general descriptor of Brillouin scattering.

Over recent years, Sandia National Laboratories has developed a communication system that uses extensional stress waves in hollow steel drill pipe to carry encoded data (for example, see U.S. Pat. No. 5,128,901, to Drumheller). Drill pipe is used to drill for natural gas and oil as well as other natural resources such as geothermal energy stored in hot subterranean fluids. The devices are used to transmit data back to the surface from instruments housed in the drill string near the bit. Other so-called "down-hole" communication systems are already employed by drilling companies because drillers would like to know where they are heading. They would also like to know some of the formation characteristics. For example, is oil present?

Obviously, it is also possible to establish a communication link with a data cable stretched down the hollow interior of the drill pipe, but the cable deployment interrupts the drilling process. It is not economical. The commonly used alternative is to transmit the data as a sequence of pressure pulses in the well mud. This is a very slow method of communication, and unless data compression methods are employed the data-transmission rate is less than 1 baud. Also, it does not always work, especially if gas is injected into the mud, and that is becoming a more common practice called under-balanced drilling.

An "acoustical telemetry system" using extensional stress waves bypasses many of these problems. A 10-W transmitter can easily communicate at 10 to 100 baud even without employing data compression methods. But it has range limitations. Presently, the method can be used to communicate over distances in excess of 10,000 feet, but drilling projects are getting deeper. Some projects are reaching beyond 25,000 feet. The answer is to use repeaters. From the standpoint of compatibility with standard drilling process, this is possible because the repeater would be totally contained within the wall of the drill pipe, and it would only require small amounts of electrical energy ($\leq 100$ mW) that are available from modest sized battery packs.

The crux of the successful design of a repeater is to reduce what is often called "injection loss". This term is used to describe the following problem. Suppose a wave propagates along the drill string when it encounters a repeater. Unless the repeater is carefully designed, some of the energy of this incident wave will be reflected back into the drill pipe. The remainder of the signal will then be injected into the repeater in a weakened state that is more difficult to detect. Likewise, after one measures this signal one can use a phased array of transducers within the repeater to relay the message in a specified direction, but as that wave tries to leave the repeater a portion of it will also be reflected; that is, the repeater will be unable to inject all of its energy back into the drill pipe. The injection losses suffered by waves trying to get into and out of the repeater can be significant. As a penalty for ignoring this issue we might actually have to double the number of repeaters in the system.

One can solve the injection-loss problem by matching the wave impedance of a repeater to that of the drill pipe. Indeed, the impedance of the repeater is easily characterized as that of a uniform thick-walled cylinder, which is the product of the mass density, sound speed, and cross-sectional area of this cylinder. In terms of the usual electrical analogy for these systems, the repeater impedance is a real number and therefore purely resistive. G. S. Kino, *Acoustic Waves: Devices, Imaging, and Analog Signal Processing*, Prentice-Hall, Englewood Cliffs, N.J., p. 9 (1987).

In contrast, the computation of the impedance of the drill pipe is far more difficult because it is a periodic structure. It is composed of individual 30-ft joints of hollow tubing threaded together with relatively massive connections called tool joints. In fact, the impedances of the tool joints are about five times greater than the impedances of the tubes. This forms a one-dimensional periodic structure of hollow cylinders connected in a straight line along their respective central axes. The array exhibits classical characteristics that are similar to those of an electrical comb filter. The system has already been studied in detail as a classical eigenvalue problem in D. S. Drumheller, "Acoustical properties of Drill Strings", *J. Acoustical Society of America* 85:1048–1064 (1989) and T. G. Barnes, et al., "Passband for acoustic transmission in an idealized drill string", *J. Acoustical Society of America* 51:1606–1608 (1972). Indeed, it is typically preferred to communicate with a carrier frequency of either 635 Hz, which is the center of the third passband, or 920 Hz, which is the center of the fourth passband. The next step, unknown in the field of wave propagation, is to look at the eigenvectors associated with this eigenvalue solution. They yield the solution for the impedance of the drill string. In general, one finds that this impedance is a complex number, meaning that the drill string has a reactive impedance that cannot be matched to the purely resistive impedance of the repeater. However, as discovered by the present invention, at particular points along the length of the drill string, its impedance is also purely resistive and therefore it is possible to match the impedance of the repeater to that of the drill string at these locations. This is particularly attractive because the wave impedance is proportional to the cross-sectional area of the drill string, and that parameter is easily changed during the design and actual fabrication of the repeater.

It is important to notice that the drill-string problem is a special case of a larger class of problems. Léon Brillouin wrote a classical text about these solutions in 1946, L. Brillouin, *Wave Propagation in Periodic Structures*, Dover, N.Y. (1946). Indeed, the phenomena exhibited by the drill string is often called Brillouin scattering, and it is a special case of what he calls the "one-dimensional mechanical lattice". In his book he says, "The one-dimensional mechanical lattice is an academic rather than a practical problem, and the only important instance of one-dimensional structures is found in electric lines". On this particular point, Brillouin was incorrect. The injection loss problem gives one an opportunity to apply relatively abstract wave physics to an extremely important commercial application.

Referring to FIG. 1, a repeater 16 in a drill string 10 comprising tubes 18 and tool joints 19 according to the invention can be constructed by placing a pair of accelerometers 12 and a pair of piezoelectric PZT transmitters 14 into a steel housing. The accelerometers are used to measure weak waves approaching from the left. After interpreting the data in this signal, the invention uses the PZT transducers to broadcast a much stronger message signal to the right. The virtue of using PZT transmitters is that relative to other devices such as magnetostrictive terfenol, they are inexpensive, energy efficient, easy to construct, and simple to power. But most importantly, they can be formed into continuous rings that surround the central core of the repeater housing. In this way the impedance of the PZT stack can be very closely matched to that of its steel housing. Indeed, one can accomplish systems in which the wave impedances of the different repeater elements are so closely matched that it is reasonable to model all of them as a single homogeneous hollow-circular cylinder. U.S. Pat. Nos. 6,147,932, 6,188,647, 5,222,049 and 5,703,836, to Drumheller. Thus, to solve the injection-loss problem one need only match the impedance of this hollow cylinder to that of the drill pipe. The simplest way of doing this is to adjust the cross-sectional area of the steel housing of the repeater.

Determination of the impedance of this hollow cylinder is as follows. Consider the following relationships:

$$F/A = E\frac{\partial u}{\partial x}; \frac{\partial F}{\partial x} = \rho Aa,\qquad \text{Equation 1}$$

where F is the axial force (positive in tension) acting on the cross-sectional area A of the cylinder. The cylinder has a mass density of $\rho$ and a Young's modulus of E. In terms of the position x and time t, the axial motion of the cylinder is described by its displacement u, velocity $v \equiv \partial u/\partial t$, and acceleration $a \equiv \partial^2 u/\partial t^2$. The first expression in Eq. 1 is Hooke's Law for the axial deformation of the cylinder, and the second expression is Newton's Second Law of Motion. One can combine these two equations to obtain the following wave equation:

$$\frac{\partial^2 u}{\partial t^2} = c^2 \frac{\partial^2 u}{\partial x^2},\qquad \text{Equation 2}$$

where $$c = \sqrt{\frac{E}{\rho}}\qquad \text{Equation 3}$$

is the speed of sound for an extensional wave propagating in a bar. As an example, for steel c=5.13 km/s. If the characteristic wavelength of the propagating wave is long in comparison to the diameter of the cylinder, Hooke's Law accurately represents the extensional motion produced by the wave. A typical diameter for the steel drill-string components in a well is 6 inches. Waves with frequencies below 8 kHz have wavelengths that are more than four times this diameter, and they are accurately modeled by this wave equation.

The d'Alembert solution to the wave equation is $$u(x,t)=f(x-ct)+g(x+ct),\qquad \text{Equation 4}$$

where $f(\cdot)$ and $g(\cdot)$ are arbitrary functions of the special combinations x±ct of time and position. D. S. Drumheller, *Introduction to Wave Propagation in Nonlinear Fluids and Solids*, Cambridge University Press, p. 105 (1998). From the d'Alembert solution one obtains the result that $$F=\mp zv\qquad \text{Equation 5}$$

where the − and + signs are used respectively for waves traveling in the positive-x and negative-x directions, and $$z=\rho ca\qquad \text{Equation 6}$$

is the wave impedance of the cylinder. The wave impedance z is the key to the injection-loss problem because it relates the force F to the material velocity v. These are the two variables that are continuous across the interfaces between the different cylindrical elements of a one-dimensional drill string. As with the traditional solutions for waves in infinite media, the amplitudes of the reflected and transmitted waves at these interfaces are solely determined by the wave impedances of the two cylinders adjacent to each interface. If the impedance remains constant across an interface, there is no reflection and hence there is no injection loss.

Notice that the cross-sectional area A of the cylinder appears in the expression for the wave impedance. Thus, even if two adjoining cylinders are made from the same material, a wave reflection will occur if they have different cross-sectional areas. It is also possible that the intersection of two cylinders of different material will not produce a reflection provided their cross-sectional areas are adjusted to make their impedances equal.

The wave impedance z of the cylinder is a real number. In the nomenclature of common electrical analogies for linear wave problems, one says that this impedance is purely resistive. Because one is interested in wave reflections at the interface between the cylinder representing the repeater and the drill pipe assembly, attention now turns to evaluating the impedance of the drill pipe. For it one finds a far more complicated situation.

The hundreds of tool-joint connections in a typical drill string cause a complex set of wave reflections that form the comb filter effect mentioned earlier. This forces one to broadcast narrow-band signals that fall within the frequency boundaries of the passbands of this periodic structure. Indeed, one already knows that the frequency characteristics of the periodic drill string are analyzed as an eigenvalue problem. D. S. Drumheller, "Acoustical properties of drill strings", supra. The solution to the injection loss problem is found in the eigenvectors of the same analysis.

Consider any adjacent pair of cylinders of the drill string 10, that is, a cylinder that represents a tool joint 19 and a neighboring cylinder that represents a tube 18. They are illustrated with solid lines in FIG. 2. Notice their common interface is located at x=0. In the tool joint x<0, and in the tube x>0. The length, cross-sectional area, mass density, and speed of sound of each cylinder are $d_s$, $a_s$, $\rho_s$, and $c_s$, where s=1,2 denotes the tube and tool joint, respectively. Each of these cylinders is represented by a wave equation similar to Eq. 2. Examine the following time-harmonic solutions for the traction and the material velocity in each cylinder:

$$F_s(x,t)=F_s(x,\omega)\exp(i\omega t),\qquad \text{Equation 7}$$

$$v_s(x,t)=V_s(x,\omega)\exp(i\omega t),\qquad \text{Equation 8}$$

in which $$F_s(x,\omega)=A_s \exp(-iK_s m)+B_s \exp(iK_s m),$$ Equation 9

$$z_s V_s(x,\omega)=A_s \exp(-iK_s m)-B_s \exp(iK_s m),$$ Equation 10 and $$z_s=\rho_s c_s a_s,$$ Equation 11

$$K_s=\omega/z_s,$$ Equation 12

$$m = \begin{cases} \rho_2 a_2 x; & x<0 \\ \rho_1 a_1 x; & x>0 \end{cases}.$$ Equation 13

Here $A_s$ and $B_s$ are arbitrary constants, $\omega$ is the circular frequency, and $i^2=-1$. Two sets of conditions are applied to these solutions. The first set of conditions requires that the force and velocity are continuous at $x=0$. The second set of conditions arises from the Floquet Theorem, see Brillouin at p. 173, which says that the solutions must have the following form:

$$F_s(x,\omega)=f_s(m,\omega)\exp(-ikmd/r),$$ Equation 14

$$z_s V_s(x,\omega)=g_s(m,\omega)\exp(-ikmd/r),$$ Equation 15 where k is the complex wavenumber and $$r_s=\rho_s a_s d_s,$$ Equation 16

$$r=r_1+r_2,$$ Equation 17

$$d=d_1+d_2.$$ Equation 18

Each set of functions $f_s(x,\omega)$ and $g_s(x,\omega)$ must form a periodic field of period d. In D. S. Drumheller, "Acoustical properties of drill strings", supra, it is shown how these conditions lead to the two requirements of continuity $$f_2(0,\omega)=f_1(0,\omega),$$ Equation 19

$$(1/z_2)g_2(0,\omega)=(1/z_1)g_1(0,\omega).$$ Equation 20 and the two requirements of periodicity $$f_2(-d_2,\omega)=f_1(d_1,\omega),$$ Equation 21

$$(1/z_2)g_2(-d_2,\omega)=(1/z_1)g_1(d_1,\omega).$$ Equation 22

Taken together these four conditions form the following eigenvalue problem:

$$[C_{ij}]\begin{bmatrix} A_1/z_1 \\ B_1/z_1 \\ -A_2/z_2 \\ -B_2/z_2 \end{bmatrix} = \begin{bmatrix} 0 \\ 0 \\ 0 \\ 0 \end{bmatrix},$$ Equation 23 where $$[C_{ij}] = \begin{bmatrix} z_1 & z_1 & z_2 & z_2 \\ 1 & -1 & 1 & -1 \\ z_1 e^{\alpha_1 r_1} & z_1 e^{\beta_1 r_1} & z_2 e^{-\alpha_2 r_2} & z_2 e^{-\beta_2 r_2} \\ e^{\alpha_1 r_1} & -e^{\beta_1 r_1} & e^{-\alpha_2 r_2} & -e^{-\beta_2 r_2} \end{bmatrix},$$ Equation 24 and $$\alpha_s=i(kd/r-K_s),$$ Equation 25

$$\beta_s=i(kd/r+K_s).$$ Equation 26

Equation 23 completely characterizes the behavior of the drill pipe within the context of the wave analysis of the present invention.

For any real value of the circular frequency $\omega$, one must evaluate the complex wave number k and the four constants, $A_1, A_2, B_1$, and $B_2$. To do this, one first assumes a value of the circular frequency. For a nontrivial solution of Eq. 23 to exist, the determinant of $[C_{ij}]$ must be zero. Evaluation of this determinant yields the following characteristic equation:

$$\cos kd=\cos(\omega d_1/c_1)\cos(\omega d_2/c_2)-(1/2)(z_1/z_2+z_2/z_1)\sin(\omega d_1/c_1)\sin(\omega d_2/c_2).$$ Equation 27

This transcendental equation is used to evaluate the eigenvalue k. Over certain regions of $\omega$, k has real values. These frequency regions are called passbands. Over the remaining values of $\omega$ that lie between the passbands, k has complex values. These regions are called stopbands.

TABLE 1

Properties of steel drill pipe, $p = 7.89$ Mg/m$^3$ and $c = 5.13$ km/s

| Component | $d_s$ (m) | $A_s$ (mm$^2$) | $Z_s$ (Mg/s) |
|---|---|---|---|
| Tube | 8.84 | 3400 | 138 |
| Tool Joint | 0.61 | 16000 | 649 |

Consider a typical drill string whose properties are listed in Table 1. The passbands and stopbands of this drill string are illustrated in FIG. 3. The shaded regions are the stopbands, and the clear areas between them are the passbands. Both the passbands and the stopbands are numbered in sequence from the left. For example, 600 Hz falls in passband 3, and 500 Hz falls in stopband 2. Within each passband two quantities are shown. The phase velocity $c \equiv \omega/k$ is illustrated as a dashed line, and the group velocity $c_g \equiv d\omega/dk$ is illustrated as a solid line. Notice that the group velocity drops to zero at the edges of the passbands. This means that standing waves develop at these frequencies. Communication is only possible in the central portions of the passbands.

Information about the telemetry problem at issue herein is contained within the eigenvalue analysis just described. By using this analysis, the carrier frequencies have been identified that will successfully propagate long distances through drill pipe. However, to analyze the injection-loss problem one must proceed one step further to the evaluation of the four components $A_1, A_2, B_1$, and $B_2$ of the eigenvector. While this may seem routine, the real issue is the interpretation and practical use of the results of that exercise.

The components of the eigenvector can only be evaluated to within a common arbitrary constant, $\eta$. The solutions are $$A_1=\eta z_1 \text{cof}(C_{11}),$$ Equation 28

$$B_1=\eta z_1 \text{cof}(C_{12}),$$ Equation 29

$$A_2=-\eta z_2 \text{cof}(C_{13}),$$ Equation 30

$$B2=-\eta z_2 \text{cof}(C_{14}),$$ Equation 31 where cof($C_{ij}$) represents the cofactor of the matrix element $C_{ij}$. While the solutions for $F_s$ and $v_s$ can only be determined to within an arbitrary constant, the impedance $z(x,\omega)=F_s/v_s$ can be determined exactly by substitution of the results from Eqs. 28–31 into Eqs. 14–15.

Figure 4:
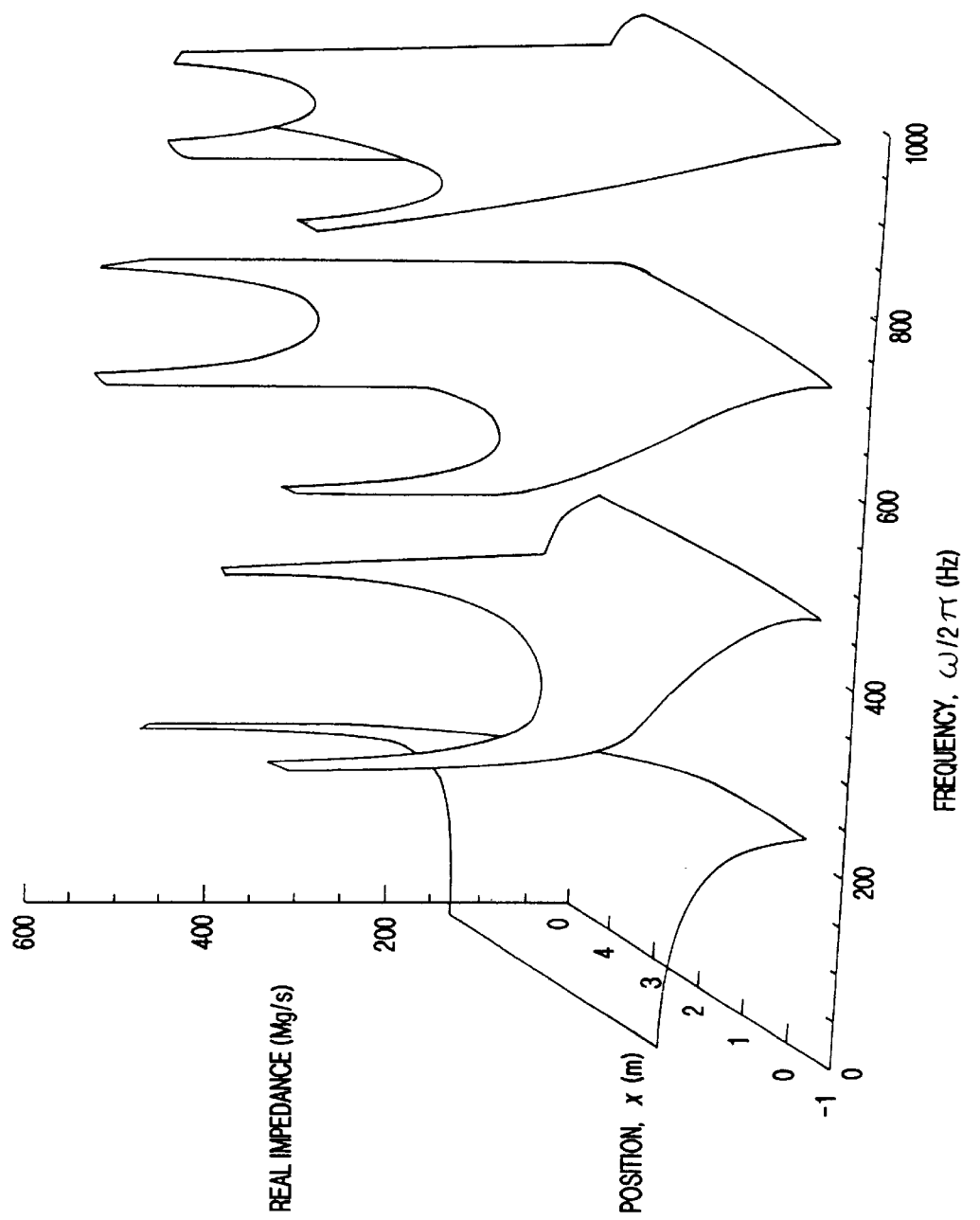
FIG. 4 is a three-dimensional plot of the real part of the wave impedance of drill pipe.

The impedance of the drill string described in Table 1 is shown in FIG. 4. This is a plot of a three-dimensional surface that represents the real part of this impedance function. The vertical axis is Real[z(x,ω)]. Position ω and frequency w are the horizontal axes. Only Real[z(x,ω)]] between $-d_2/2 \leq x \leq d_1/2$ is plotted because it is symmetric about both $x=-d_2/2$ and $d_1/2$. The illustrated frequency range includes the first four passbands of the drill string. Notice that Real[z(x,ω)]>0 in the passbands. It is actually negative in the stopbands, but it does not appear so here because of the clipping of the plotted values of impedance to lie between 0 and 600 Mg/s. Within the passbands, the shading of the surface represents the phase angle φ(x,ω) of the impedance, $$\phi = \tan^{-1}[\text{Imaginary}(z)/\text{Real}(z)].$$  Equation 32

The ridge lines of the saddles as well as the lines $x=-d_2/2$ and $d_1/2$ correspond to locations where φ=0. The lighter regions correspond to φ>0 and the darker regions correspond to φ<0.

Figure 5:
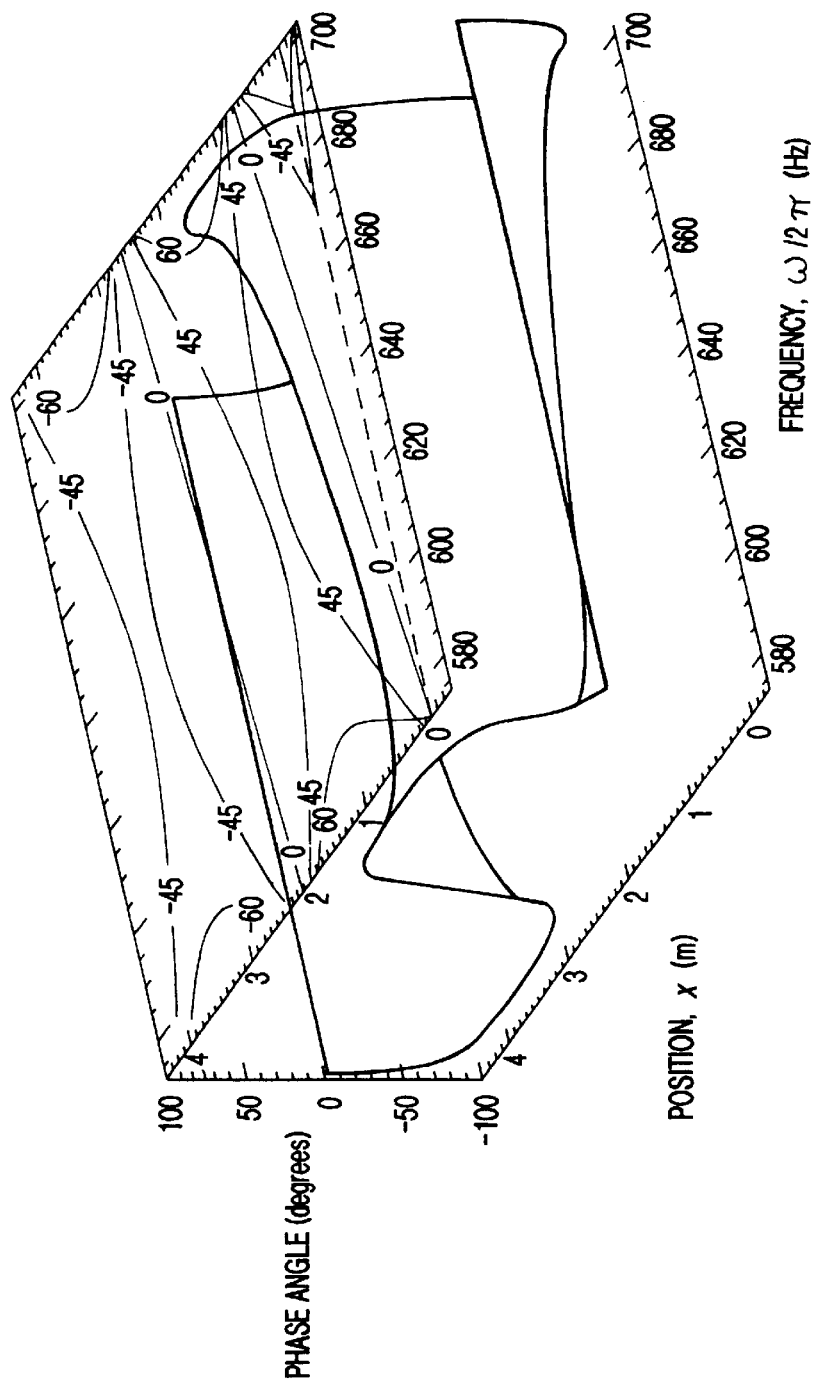
FIG. 5 is a three-dimensional plot of phase angle of drill pipe in the third passband.

In FIG. 5, another illustration of the phase angle φ is presented for the third passband. As before the results are plotted for one half of a tube and tool joint. The function φ(x,ω) is plotted as a shaded surface with the vertical axis representing φ. In this case the shading is from a light source and does not correspond to any variable from the analysis. Contours of constant phase angle are projected to a plane above this surface and labeled in non-uniformly spaced levels of (−60,−45,0,45,60) degrees. The dashed line x=0 represents the interface between the tool joint and the tube. Within the passband $-\pi/2 \leq \phi \leq \pi/2$. The phase angle is antisymmetric about the midpoints of the tool joint and tube. Thus, in this passband as well as all others, $\phi(-d_2/2,\omega) = \phi(d_1/2,\omega) = 0$ and the impedance is always pure real at these locations. Furthermore, these are the only two physical locations where Imaginary(z) is zero for all frequencies. Because of this fact, at these particular points it is possible to match the impedance of the drill string to that of a uniform cylinder of constant diameter. These are two points at which one can connect the repeater of the invention. Other points of zero phase angle exist and can also be used provided that the frequency is sufficiently restricted to compensate for the fact that the phase angle is zero only at one frequency as such locations.

Figure 6:
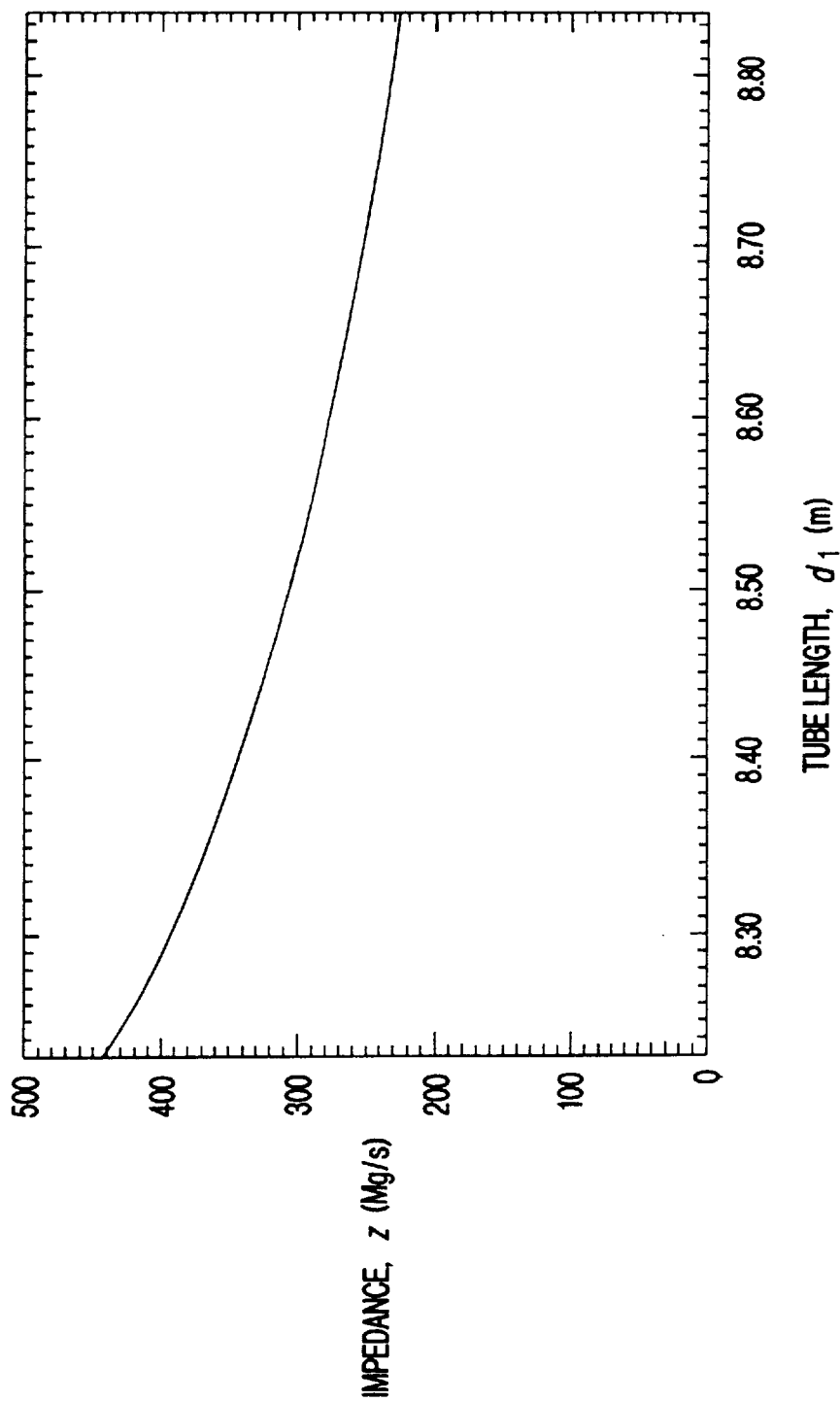
FIG. 6 is a graph of the effect of tube length on the impedance at the midpoint of a tool joint for a frequency of 635 Hz.

Actual drill strings are often assembled from individual pipes that exhibit significant variations in length. While some "30-ft" pipe is manufactured with length tolerances under an inch, other pipe may vary by as much as 3 feet. The present impedance analysis offers some interesting insights into the effects of such aperiodicity. Indeed, one can note that drill pipes are joined together near the midpoints of the tool joints, and different length pipes have different impedances at this location. For a frequency of 635 Hz it is shown how the impedance at the midpoint of the tool joint changes with tube length. See FIG. 6. Much of this change results from a shift in the location of the passband as we alter the tube length. Thus, while 635 Hz is at the center of the third passband for the longer tubes, it is off center for the shorter tubes. Clearly, an impedance mismatch will occur when drill pipes of different lengths are connected together. One way of reducing the effects of numerous mismatches in a long drill string is to rearrange the individual drill pipes according to length. This moderates strong reflections by producing a "smooth gradient" in the impedance. Such an idea was actually tested in the field. D. S. Drumheller, "Attenuation of sound waves in drill strings", *J. Acoustical Society of America* 94:2387–2396 (1993); and D. S. Drumheller, et al., "The propagation of sound waves in drill strings", *J. Acoustical Society of America* 97:2116–2125 (1995). The effect of reordering the pipes was significant and reduced the apparent wave attenuation in the drill string by more than 50% in some passbands. See U.S. Pat. No. 5,477,505.

The discussion now returns to the repeater problem. Suppose one must detect and repeat a communication signal that is broadcast in the third passband of the drill string. At an appropriate location one breaks the drill string apart and inserts a repeater into it. The goal is to choose a location that allows one to match the impedance of the repeater to that of the drill string. This will minimize or possibly even eliminate injection loss.

Figure 7:
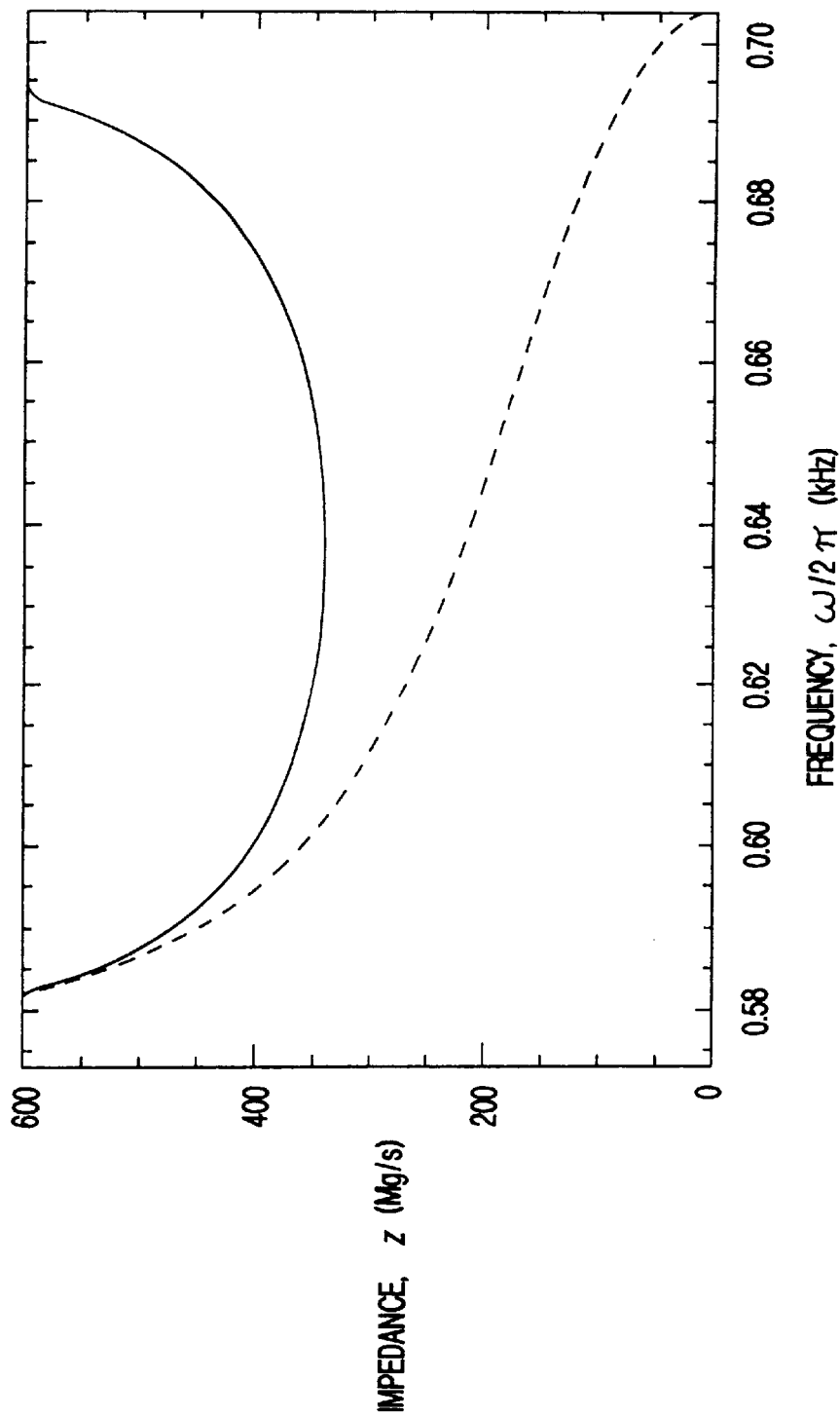
FIG. 7 is a graph of midpoint impedance of tubes (—) and tool joints (- - -)

The impedance of the repeater is real number. Thus, one must select a location on the drill string where its impedance is also real. That, for example, occurs at the midpoints of each tube and tool joint of the drill string. In FIG. 7 the impedance of the drill string over the third passband is illustrated. The dashed line is the impedance at the midpoint of the tool joint, and the solid line is the impedance at the midpoint of the tube.

For any given frequency note that the impedance of the drill string is greater at the midpoint of the tube. Choosing this location will allow the repeater to have a larger cross-sectional area. For example, if the repeater has an impedance of 348 Mg/s, then it will match the impedance at the midpoint of the tube over most frequencies in the central portion of the third passband. Moreover, suppose the repeater case is constructed of steel where $\rho=7890$ kg/m$^3$ and c=5.13 km/s. Then from Eq. 6, to eliminate injection loss the cross-sectional area of the repeater must be $$A = z/\rho c = 3.48 \times 10^5/(7890 \times 5130) = 0.0086 \text{ m}^2 = 13.2 \text{ in}^2.$$  Equation 33

If instead the repeater is attached to the midpoint of a tool joint where the impedance is approximately 220 Mg/s, then its cross-sectional area must be $$A = z/\rho c = 2.2 \times 10^5/(7890 \times 5130) = 5435 \text{ mm}_2 = 8.42. \text{ in}^2$$  Equation 34

Either placement will allow for an equally satisfactory exchange of acoustic energy between the drill string and the repeater. However, if one attaches the repeater to the midpoint of a tube one will have a greater volume in which to house the components.

So far the discussion has been restricted to analysis of the repeater and the drill pipe to the behavior of time-harmonic waves. However, another analysis tool exists that is extremely important. It is a straightforward method for the computation of the transient response of stress waves in this one-dimensional geometry. D. S. Drumheller, "Extensional stress waves in one-dimensional elastic waveguides", *J. Acoustical Society of America* 92:3389–3402 (1992). This method is based upon the method of characteristics, and indeed, as previously demonstrated, it provides analytical solutions to certain classes of problems. Moreover, these solutions have proven to be reliable predictors of wave behavior not only in a controlled laboratory setting, but also in actual field test applications. See D. S. Drumheller, "Attenuation of sound waves in drill strings", supra; and D. S. Drumheller, et al., "The propagation of sound waves in drill strings", supra. Application of this analysis to the repeater design of the present invention will further reduce injection losses.

In FIG. 1 a repeater mounted in a drill-string was illustrated. Signals in the form of propagating stress waves approach the repeater along the drill pipe from the left. The job of the repeater is to detect the messages in these relatively weak incoming signals and rebroadcast them as high-amplitude stress waves that continue to propagate along the drill pipe to the right. The encoding aspect of the repeater design is similar to most communication systems wherein the rate of transmission of data is limited by the bandwidth of the transmission path, which in this case is approximately one half of the width of the passband or passbands used to carry the signal. As already noted, one crucial issue for the successful operation of the repeater is injection loss. However, a second crucial issue now presents itself. Can one spatially isolate the processes of detection and rebroadcast so that both processes might occur simultaneously and at the same frequency, or will the feedback from the strong outgoing signal mask the weak incoming message? This new issue of isolation also depends directly upon reduction of injection loss.

As before, assume that the repeater operates over a range of frequencies that lie within the central half of the third passband. The center of this band is at f=635 Hz. The repeater itself has two PZT transmitters. Let the wavelength of f be $\lambda$. The distance between PZT transmitters is $\lambda/4$, where $$\lambda/4=c/(4f)=5130/(4\times635)=2 \text{ m}. \quad \text{Equation 35}$$

To the left of the transmitter array are two accelerometers that are also spaced $\lambda/4$ apart. As shown below, one can use the $\lambda/4$ spacing of the accelerometers and the transmitters to operate both of them as phased arrays that only detect and rebroadcast waves that propagate to the right. The impedances of all of the transducer elements as well as the surrounding casing are adjusted to the results of Eq. 33.

Suppose that the repeater is infinitely long. In particular suppose the two PZT transmitters are spaced $\lambda/4$ apart within an infinitely long rod, in which all the components have identical impedances. From the symmetry of this geometry it is clear that if either transmitter is driven alone with a signal of frequency f, it will emit extensional waves of equal stress amplitudes in both directions. Indeed, given the design constraints of the drilling system, there does not appear to be a practical transducer design that does not exhibit this symmetry property. However, as shown below, a simple electrical circuit can be employed to drive both transmitters in such a way as to emit wave energy in only one direction. This type of phased array is effective for controlling the direction of the emitted wave energy not only at the frequency f to which it is tuned, but also over the entire passband. Indeed, in practice the ratios of the energy broadcast in each direction can be controlled to greater than 30 dB over this entire range of frequencies. U.S. Pat. No. 5,056,067.

One can also operate the accelerometers as a phased array. Below is a discussion of an array that only senses waves that propagate to the right. Again, in practice the signal outputs produced by left-traveling and right-traveling waves also differ by more than 30 dB. When the accelerometer and transmitter arrays are combined as a repeater in an infinitely long rod, feedback isolation can be as high as the combined directional sensitivities of the transmitter and accelerometer arrays, which in this case is 60 dB. However, this degree of isolation has only been achievable in long uniform rods where there are no injection losses.

Figure 8:
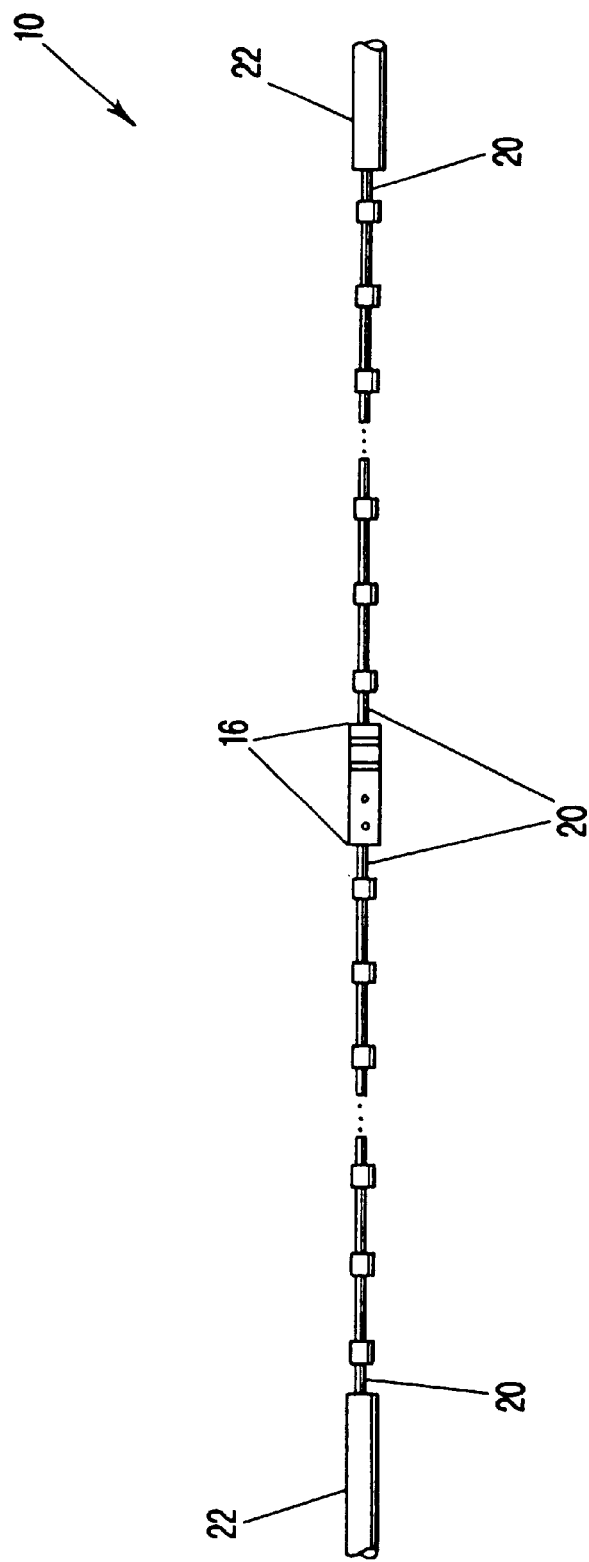
FIG. 8 is a schematic of the repeater of the invention mounted in a drill string with infinite boundary conditions.

Return to the finite-length repeater and place it into the middle of a drill string in order to test its transient response. Referring to FIG. 8, to each end of the repeater 16 one attaches half-length tubes 20. Their purpose is to place the repeater at the midpoint of a tube of the drill string and thereby reduce the injection losses. To each of these half tubes attach 25 standard sections of drill pipe. Another half-length tube followed by a rod with an impedance equal to that of the repeater is then added to each end. Infinite boundary conditions 22 are specified at both ends of the problem. The outer half tubes and the bounding rods are not necessary to the function of the repeater. They are just a convent method to more clearly illustrate the function of the repeater by allowing the broadcast wave to exit the problem geometry.

The object now is to demonstrate that very good isolation is also possible in the finite-length repeater. This occurs for two reasons: (1) In this simple one-dimensional system the phased array of transmitters is very effective in controlling the direction of extensional waves; and (2) with the method of impedance matching of the invention of the repeater to the drill string one virtually eliminates reflections at the repeater-drill string interface.

Figure 9:
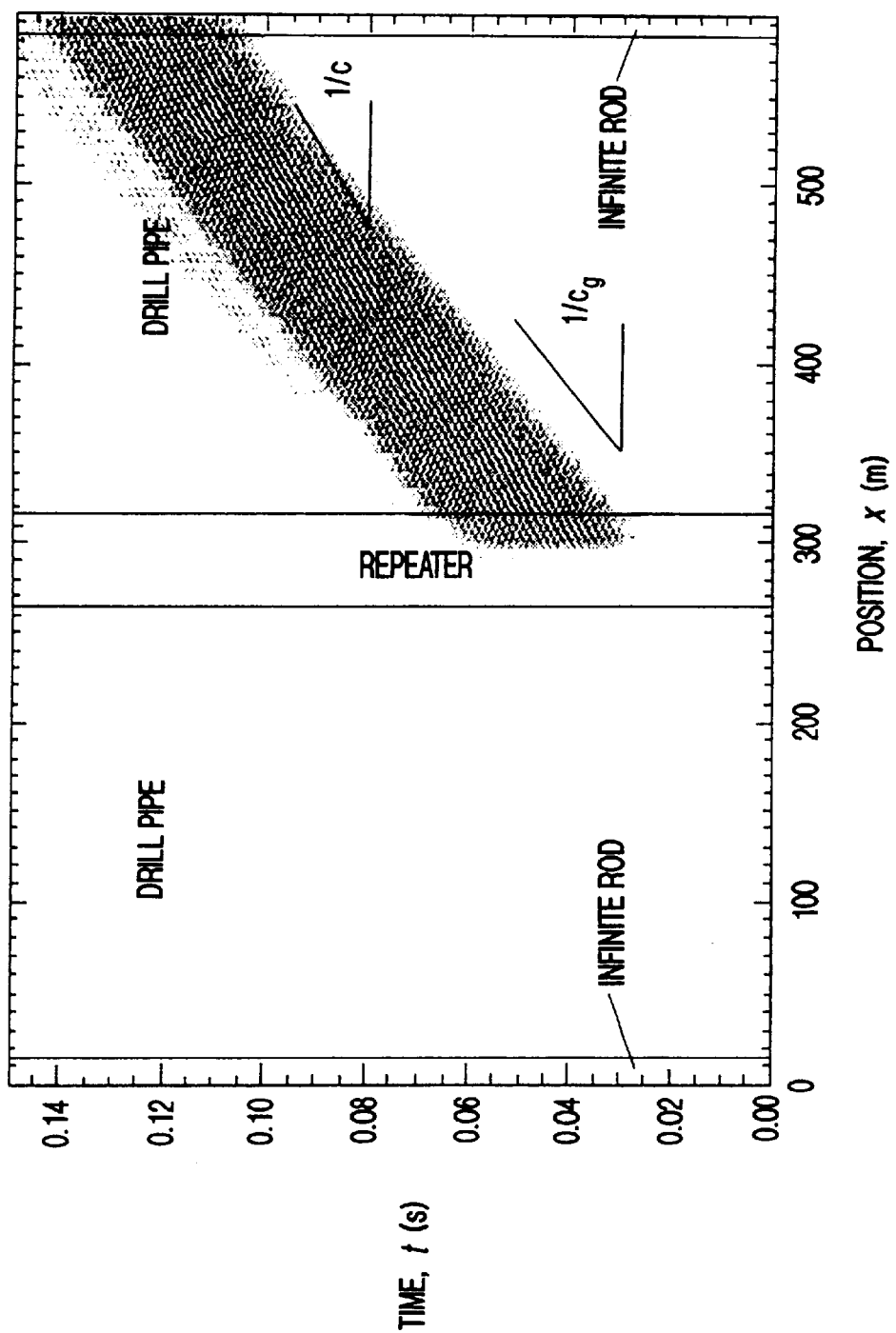
FIG. 9 is an x-t diagram of an isolation test.

To test the isolation assume that no incoming waves are approaching the repeater from the left. Now, drive the transmitter array and broadcast a signal to the right. In the absence of an incoming wave whatever signal one produces in the accelerometer array will be an indication the degree of isolation. For purposes of comparison this discussion shall also monitor the history of the material velocity v at two other locations. Both locations are at midpoints of full-length tubes in the drill string. The first midpoint-velocity measurement is directly to the right of the repeater at x≈320 m, and the second is adjacent to the right boundary rod at x≈580 m. (See FIG. 9.) One can then drive the transmitter array with two types of voltage signals—a signal of constant frequency and a burst composed primarily of 20 sine waves. Consider the burst input first.

One can drive the transducer array with a voltage signal consisting of a sequence of 20 sine waves of frequency f=647 Hz. However, this finite sequence of sine waves actually has too broad a range of frequency components. So instead pass this signal through a filter to produce another signal that primarily contains frequencies between 620 and 660 Hz. Then apply this filtered signal to the transmitter array. The results of this calculation are contained in FIG. 9 as an x-t diagram that illustrates the computed velocity v(x,t) of the drill string and repeater over all spatial points x (horizontal axis) and for every time t (vertical axis). The vertical solid lines indicate the locations of the major interfaces between the drill pipe, repeater, and the bounding infinite rods. Notice that the repeater is quite long. It has been lengthened to improve the clarity of the x-t diagram. Physical lengths of actual repeaters can easily be reduced to 5 m or less. At each particular point (x,t) the velocity v(x,t) is represented as a shade of gray. To improve the clarity of the reproduction of this image, only negative values of v are plotted with v=0 being white. The transmitter array broadcasts a wave to the right. This wave appears as a broad positive sloping stripe. The absence of a negative sloping stripe on the left is an indication of the directional characteristics of the transmitter array. Note that the signal on the right successfully leaves the repeater, travels through the 25 sections of drill pipe, enters the infinite rod on the right, and then exits the computation. The complex pattern within the stripe is an excellent illustration of the physical concepts of phase and group velocity. The slope of this stripe is equal to the inverse of the group velocity $1/c_g$. In the central portion of the third passband of the drill string, $C_g \approx 3.5$ km/s. Within the stripe one can see finer characteristic lines. These lines have slopes that are equal to the inverse of the phase velocity $1/c$, where c≈5 km/s.

Figure 10:
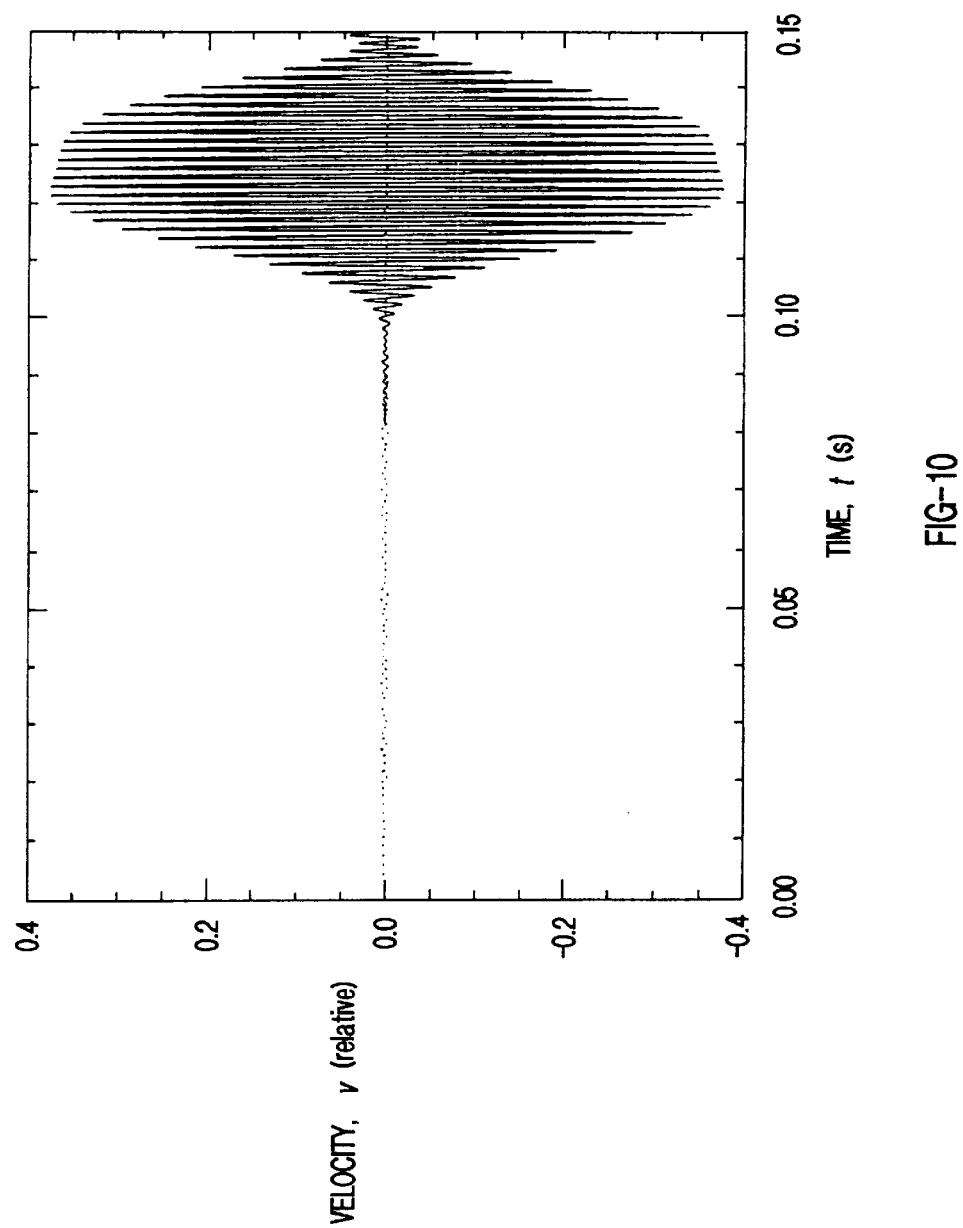
FIG. 10 is a graph of the velocity histories for the isolation test; the dotted line is the integrate output of the accelerometer array, and the solid line is the velocity v in drill string near x≈580 m.

To quantify the isolation between the accelerometers and the transmitters, compare the output of the accelerometer array, which is located near x≈280 m to that of the midpoint-velocity measurement near x≈580 m. Because one needs v to compute the relative energies in these waves, one integrates the accelerometer signal and plots v at both gage locations. (See FIG. 10.) The material velocity v at x≈280 m is shown as the nearly flat dotted line. The start of a weak pulse is just discemable near t=0.02 s. The much larger pulse at x≈580 m is shown as a solid line. Because of the delay associated with the propagation time across 25 lengths of drill pipe, this pulse appears later in the record. The huge difference in the amplitudes of these two signals demonstrates how well the accelerometer array is isolated from transmitter array.

To calculate the isolation note that the combined kinetic and potential energy E of a simple propagating wave is $$E=zv^2 \qquad \text{Equation 36}$$

Notice that z is the same at all gage locations because of the matching of the impedance of the repeater to that of the drill string at the midpoints of all of the tubes. Thus, the isolation can be computed by directly comparing these two signals. Let $V_1$ and $V_2$ represent the spectral amplitudes of the fast fourier transforms of the velocity signals of the array near x≈280 m and the single gage near x≈580 m, respectively. Compute the isolation in decibels as $$I=20 \log_{10}(V_2/V_1). \qquad \text{Equation 37}$$

Figure 11:
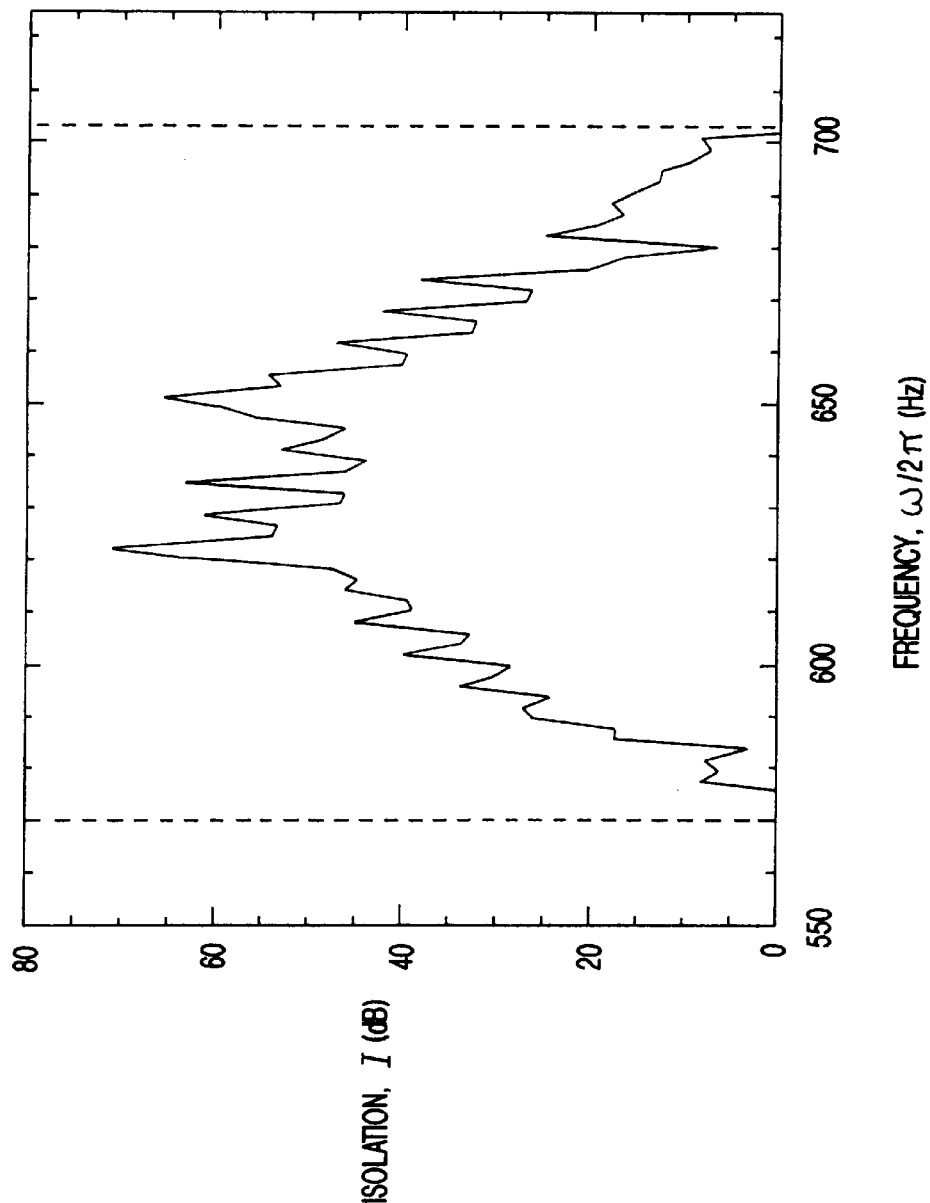
FIG. 11 is a graph of the isolation of the accelerometer array; the vertical dashed lines are the boundaries of the third passband.

Within the third passband between 620 to 660 Hz the isolation mostly ranges between 40 to 60 dB. (See FIG. 11.)

Figure 12:
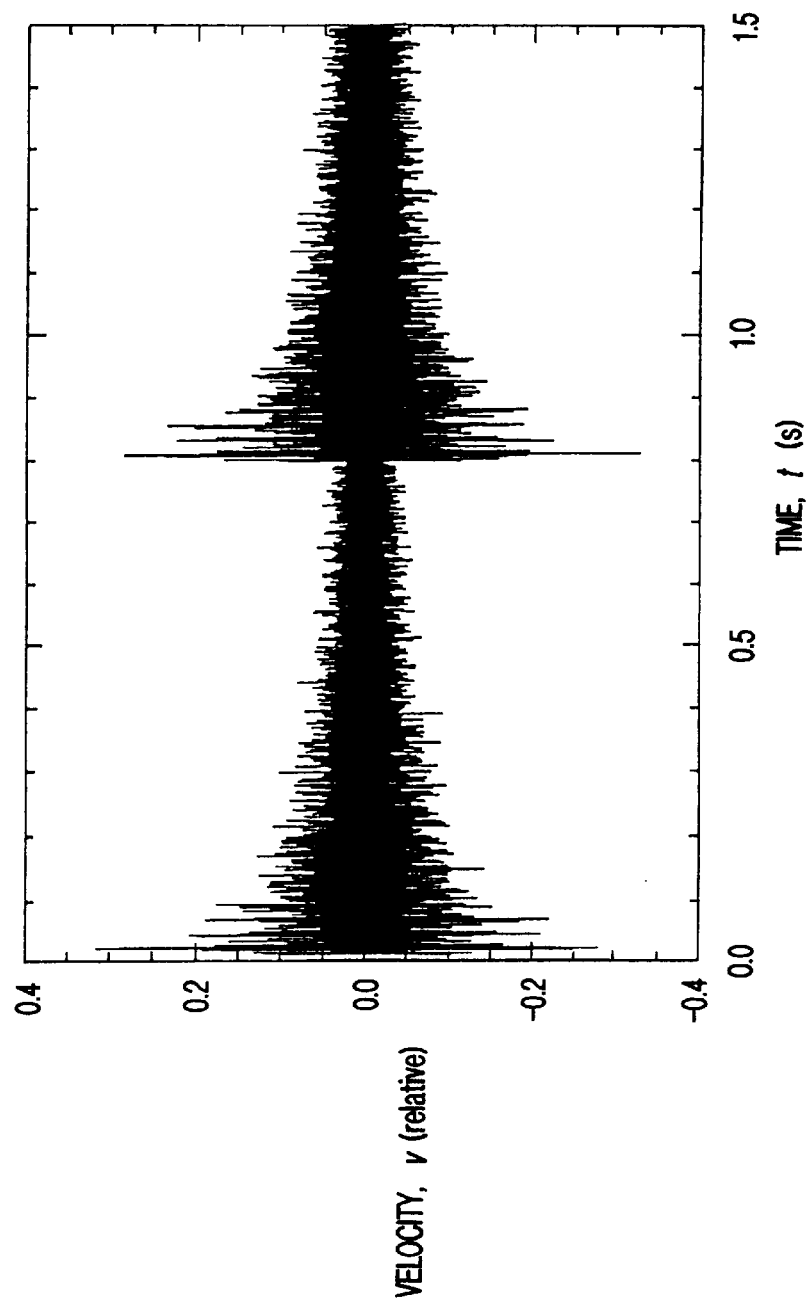
FIG. 12 is a graph of the accelerometer signal history for the constant-frequency isolation test.

Next turn to an isolation test using the constant-frequency source. Of course in a transient calculation one can only approximate a driving voltage of constant frequency. In this case a sequence of 500 sine waves each having a frequency of 635 Hz is employed. The signal from the accelerometer array is shown in FIG. 12. The velocity amplitude in this illustration is normalized to the maximum velocity v of the broadcast wave measured at x≈320 m. That wave is not shown because it is primarily a sequence of 500 sine waves of unit amplitude. The two bursts of energy in the record of the accelerometer array occur at the startup and shutdown of the drive voltage. These events generate waves in the stopband frequencies, which are trapped in the repeater. While their amplitudes seem large in the time domain, a fast Fourier transform shows a broad spectral content containing negligible amplitudes. Within the neighborhood of the third passband the isolation between the accelerometer array and the transmitters is still about 60 dB. Note that these bursts ring down over a period of more than 0.5 s. This is caused by attenuation included in this one calculation. The attenuation model is discussed in Drumheller, "Attenuation of sound waves in drill strings", supra. The parameters used were τ=200 μs, η=0.00468, and θ=2.17. These parameters provide good empirical estimates of drill string attenuation. When one removes attenuation from the calculation, the ring down in the stopbands does not occur; however, the isolation in the passband remains unchanged at 60 dB.

Figure 13:
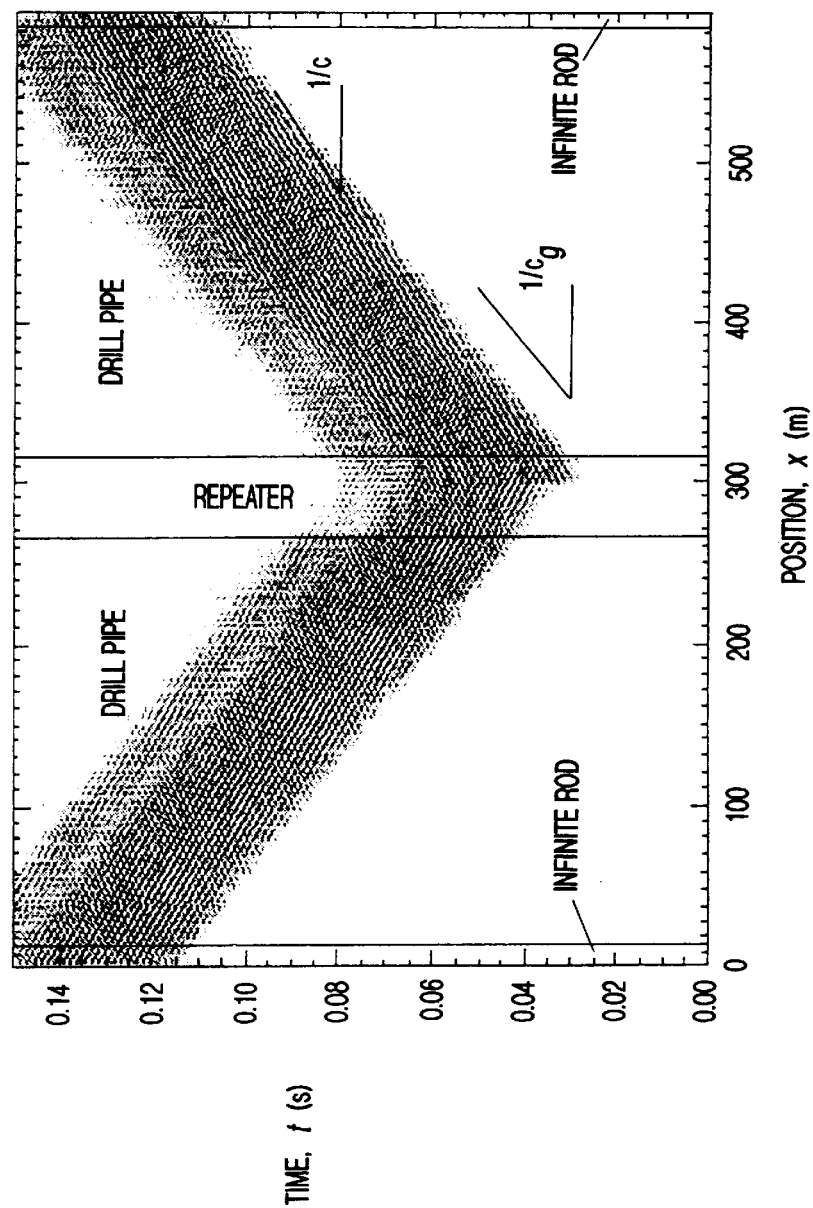
FIG. 13 is the x-t diagram of the isolation test using a quarter-pipe interface.

Isolation of the repeater has been computed by two methods. Both methods yield approximately the same results. To illustrate the importance of reducing injection loss and its effect on isolation, suppose one alters one dimension in the previous example. Instead of joining the repeater to the drill string on the right with a half-length tube, use a quarter-length tube. Everything else in the calculation remains unaltered while the transmitter array is driven by the filtered burst of 20 sine waves. The x-t diagram for this calculation is shown in FIG. 13. Here one sees that the repeater injects nearly equal levels of the wave energy into both drill strings. In this case the isolation drops to 3 dB. Indeed, this small amount of isolation is only achievable through the use of the directional accelerometer array. If instead one were to replace the accelerometer array with a single accelerometer the isolation would be degrade even further to −2 dB. This indicates that the directional capability of the transmitter array and the isolation of the accelerometer array are completely defeated by changing one of the half-length tubes to a quarter-length tube.

During typical drilling operations drill pipe is used in the upper section of the well while about 1000 ft of drill collar is used in the lower section directly above the drill bit. Drill collar is heavy-walled pipe that has uniform internal and external diameters. Pairs of male and female pipe threads are machined directly into ends of the collars and consequently tool joints are absent. In contrast to the light flexible drill pipe, which is supported in tension by the derrick hoist, the drill collars are heavy and quite stiff. They are allowed to support compression and provide the thrust loads necessary to push the rotating drill bit into the formation. There is a large mismatch in wave impedance at the junction between the drill collar and drill pipe.

A device called the quarter-wave transformer is mentioned in the patent to Hixson. This transformer serves as a method of matching the wave impedance of drill pipe to that of drill collar. Hixson proposed the use of "a 'transformer' length of pipe . . . inserted between the drill collars . . . and the drill pipe . . . , which transformer length is approximately ¼ wave length long and has a metal cross sectional . . . —approximately equal to the square root of the product of the cross sectional area of the pipe and the cross sectional area of the collars." Note that because two different cross sectional areas are associated with the drill pipe, that of the tube and the tool joint, Hixson's description is ambiguous. However, using the present impedance analysis one can determine the cross-sectional area of the Hixson transformer with precision. Indeed if one attaches the transformer between the end of the drill collar and a full section of drill pipe, the transformer cross section should be based on the impedance of the drill string at the midpoint of the tool joint. Recall that FIG. 7 shows that the wave impedance at this location is approximately 220 Mg/s. Thus, from Eq. 34, the cross-sectional area for the drill pipe that should be used in the Hixson transformer formula is A=5435 mm².

Suppose that this drill pipe is connected to drill collar that has an 8-in outside diameter and a 2-in inside diameter. The cross-sectional area of this collar is 47.1 in²=30,400 mm². To join this collar to the drill pipe one needs a transformer with a cross-sectional area of $A_t$, where $$A_t = \sqrt{(30400 \times 5435)} = 12{,}853 \text{ mm}^2 = 19.9 \text{ in}^2. \qquad \text{Equation 38}$$

The length of the transformer is selected to be 6.5 ft, which is the quarter wavelength of a 647 Hz harmonic stress wave.

Figure 14:
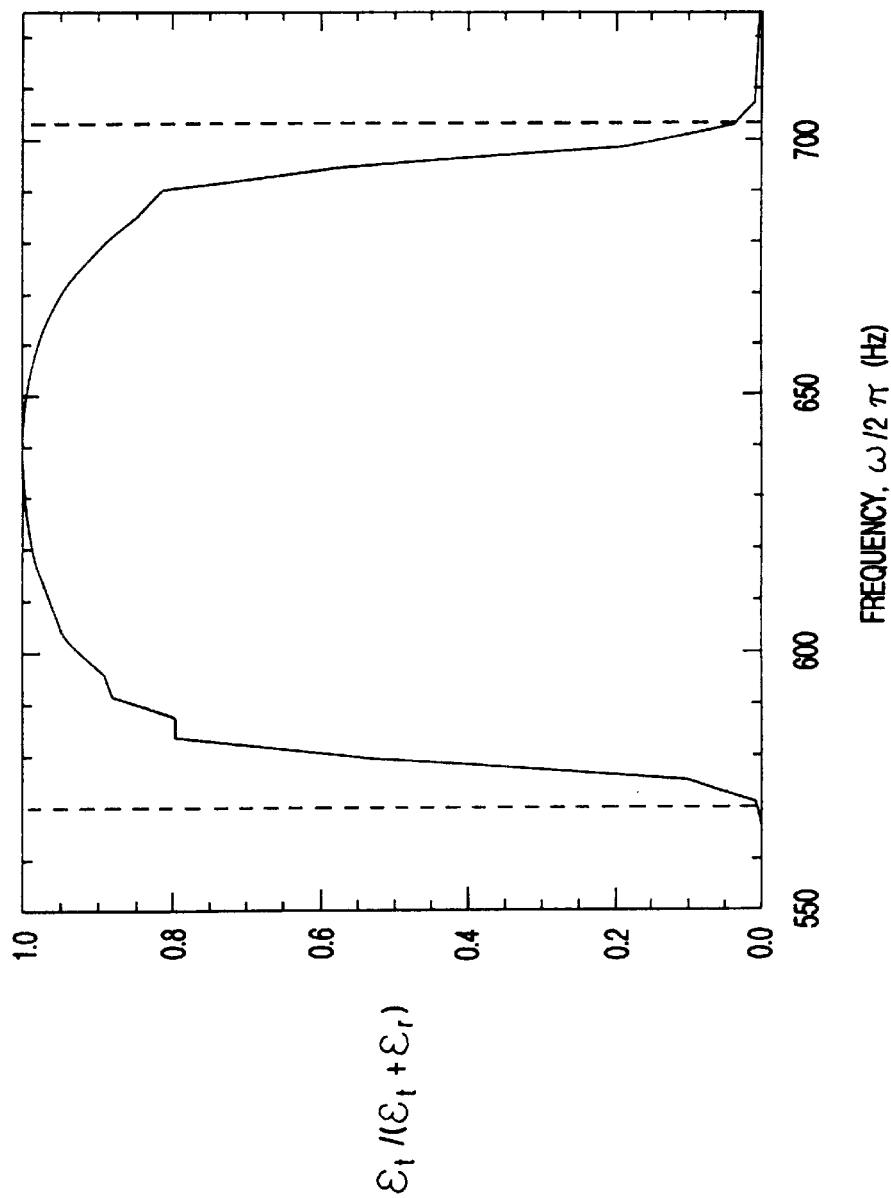
FIG. 14 is a graph of the transmission ratio of the quarter-wave transformer; the vertical dashed lines are the boundaries of the third passband.

Now test the effectiveness of the Hixson transformer by creating a single propagating impulse in velocity v in the drill collar. As this impulse strikes the transformer, part of the energy is reflected back into the drill collar and part is transmitted through the transformer and into the drill pipe. Let the spectral amplitudes of the Fourier transforms of the material velocities of the transmitted and reflected waves be $V_t$, and $V_r$, respectively. Then use Eq. 36 to calculate both the transmitted energy $E_t$ and the reflected energy $E_r$. The transmission ratio $E_t/(E_t+E_r)$ is shown in FIG. 14. Over the central half of the third passband one notices that only a few percent of the total energy of the wave is reflected by the transformer.

Below is a discussion of the wave amplifier, which is mechanically identical to the repeater; however, its electrical circuit is quite different. While the repeater receives, interpretes, and rebroadcasts a message at a specified wave amplitude, the wave amplifier simply magnifies everything that it sees. Conceptually the amplifier is an appealingly simple device. However, it is inherently unstable for all positive values of gain G, Eq. 65. To see why, return to FIG. 12 where one found that transients in the driving voltage caused the transmitters to produce energy with the stopband frequencies. This energy cannot readily leave the repeater/amplifier housing. Indeed, regardless of how low these signal levels might be, the amplifier will continue to magnify their amplitude without bound.

Figure 15:
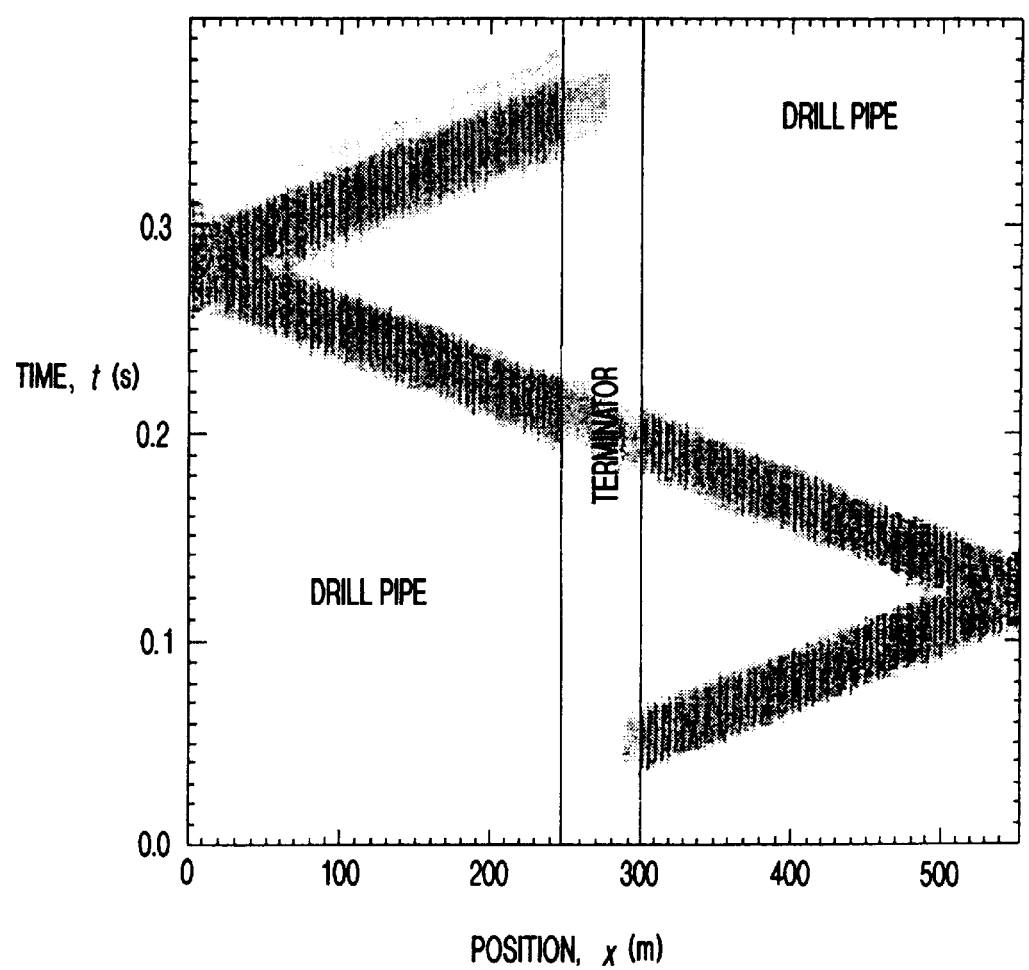
FIG. 15 is the x-t diagram of the terminator of the invention.
Figure 16:
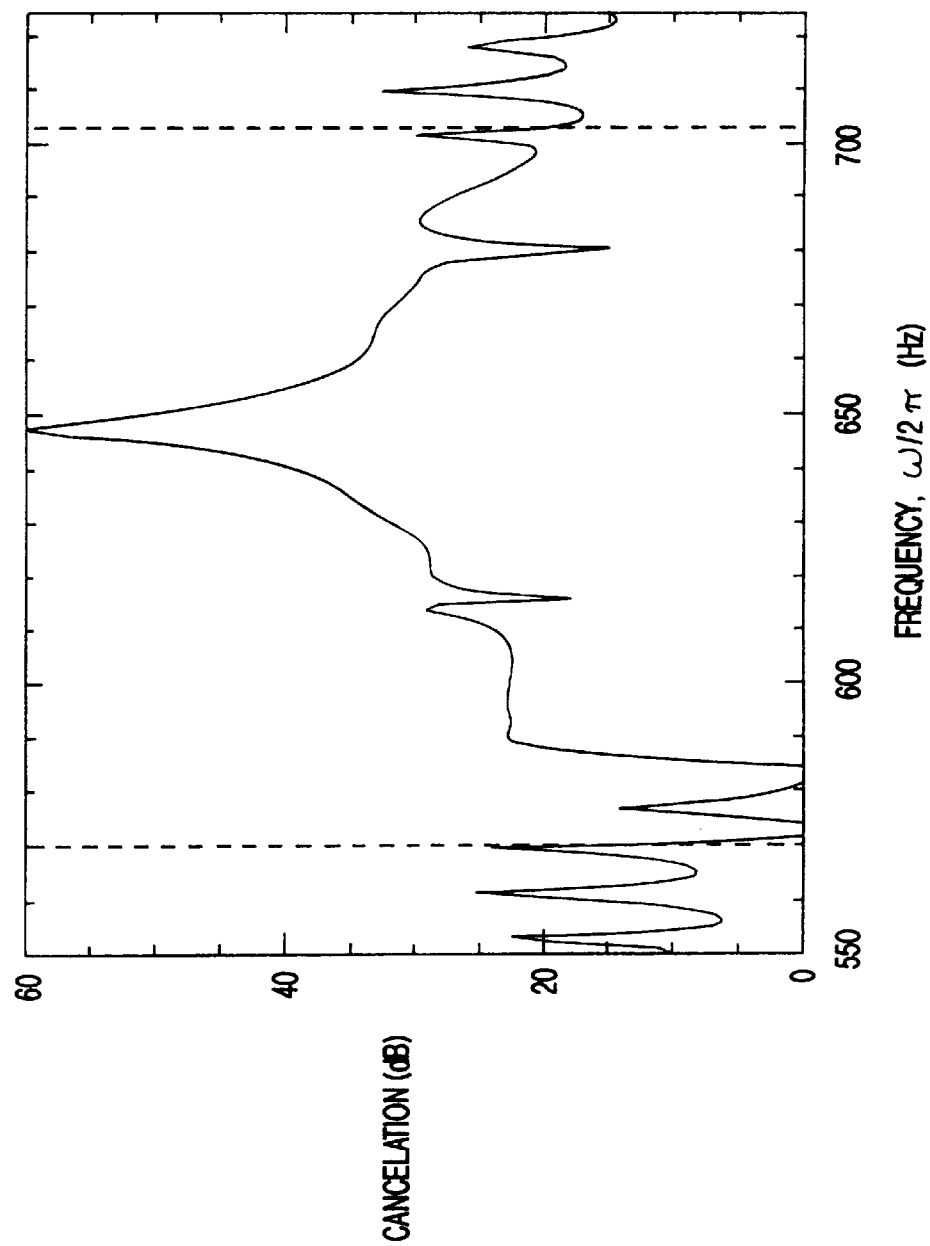
FIG. 16 is a graph of the wave cancellation capability of the terminator of the invention.

However, the amplifier has a very useful function. It can be used as a wave terminator by adjusting the gain to G=−1. Then as a right-traveling wave passes through the terminator, the transmitter array will cancel it by producing another right-traveling wave of equal amplitude but opposite sign. The present disclosure illustrates the function of a terminator by modification of the repeater geometry in FIG. 8. Replace the outer half-tubes and infinite rods with stress-free boundary conditions applied to the exposed ends of the 25 sections of drill pipe. The adjustments in gain and boundary conditions lead to the x-t diagram shown in FIG. 15. One sees that application of the filtered burst of 20 sine waves causes the transmitters to broadcast a wave to the right. This wave is then reflected by the right free boundary. It passes back though the terminator. Nothing happens because the accelerometer array is insensitive to left-traveling waves. However, the signal is next reflected by the left free boundary and returns to the terminator as a right-traveling wave. This time it is canceled. Compare the spectral energy of the wave that enters the terminator from the left to the spectral energy of the residual wave that manages to pass through the terminator. (See FIG. 16.) Notice that the signal levels over the central portion of the passband have been canceled by more than 30 dB. This example plus the repeater calculation make it clear that bidirectional communication through a repeater in the same frequency band is possible. For example, one can employ one accelerometer array between two transmitter arrays. Only weak incoming messages would be allowed in the region between the transmitter arrays. The accelerometer array would have two circuits to detect both left- and right-traveling waves.

Arrays of accelerometers 12 and PZT transducers 14 mounted on a rod 24 are illustrated in FIG. 17. All components of this system have an identical wave velocity c and wave impedance z. Analyzed here are the functions of these arrays. The two accelerometers are used to detect waves that propagate to the right but not those that propagate to the left. The two PZT transducers are used to generate stress waves that only propagate to the right. Together these arrays can be used first to detect a right-traveling wave and then either to amplify it or to cancel R. An analysis of the accelerometer array now follows.

Time and position are represented by the variables x and t. Because the wave impedance is constant and boundaries are absent, one knows that all possible extensional waves capable of propagating in this bar are represented by the following d'Alembert solution for the acceleration a:

$$a(x,t)=f[t-x/c]+g[t+x/c],\qquad\text{Equation 39}$$

where the functions f[·] and g[·] are arbitrary and represent right-traveling and left-traveling waves, respectively. Moreover, assume that both f and g are harmonic waves with a wavelength of λ. Thus, for example $$f[t-x/c]=-f[t-(x\pm\lambda/2)/c].\qquad\text{Equation 40}$$

Identical accelerometers are located at $x_1$ and $x_2$. They have negligible gage lengths, and the spacing between them is $$x_2-x_1=b=\lambda/4.\qquad\text{Equation 41}$$

The signals $S_1(t)$ measured by the two accelerometers are $$S_1(t)=C\{f[t-x_1/c]+g[t+x_1/c]\},\qquad\text{Equation 42}$$

$$S_2(t)=C\{f[t-(x_1+b)/c]+g[t+(x_1+b)/c]\},\qquad\text{Equation 43}$$

where the constant C represents the gage factor.

Delay the signal from the accelerometer at $x_2$ by b/c in time and then subtract it from the other accelerometer signal to obtain $$S(t)=S_1(t)-S_2(t-b/c)=C\{f[t-x_1/c]-f[t-(x_1+2b)/c]\},\qquad\text{Equation 44}$$

where one notices that the left-traveling wave g does not contribute to the signal S(t). Moreover, because of the periodic property of Eq. 40, one finds that $$S(t)=2Cf[t-x_1/c].\qquad\text{Equation 45}$$

Thus S(t) is a measure of the right-traveling wave alone. One sees that $$S(t-\Delta t)=2Cf[t-x/c],\qquad\text{Equation 46}$$

where $$\Delta t=(x-x_1)/c.\qquad\text{Equation 47}$$

Next is an analysis of the array of PZT transmitters. One can control them so that they only generate a right-traveling wave. The left edges of the transmitters are located at $x_j$ (j=3,4). As with the accelerometers these transmitters are also spaced a quarter wavelength apart so that $x_4-x_3=b$. Apply different harmonic voltages $\phi_j$ to the electrical leads of these transmitters causing them to expand and contract thus producing stress waves in the rod. Each transmitter operating alone produces two waves. The variables $v_j^\pm$ denote the material velocities of these waves. The plus sign denotes the wave that the transmitter radiates to the right, and the minus sign denotes the wave that the transmitter radiates to the left. The relationship between the applied voltage $\phi_j$ and the material velocities $v_j^\pm$ produced by these waves is given by Eq.(51) of D. S. Drumheller, "Extensional stress waves in one-dimensional elastic waveguides", *J. Acoustical Society of America* 92:3389–3402 (1992):

$$v_j^\pm=\pm(i/2)\omega d_{33}\phi_j,\qquad\text{Equation 48}$$

where i is the imaginary unit, ω is the harmonic frequency, and $d_{33}$ is the piezoelectric coupling coefficient. The thickness of each transmitter is δ, where Eq. 48 requires that δ<<λ. Because this discussion is only considering harmonic waves, the accelerations produced by the transmitters are computed to be $$a_j^\pm=\mp B\phi_j,\qquad\text{Equation 49}$$

where $$B\equiv(1/2)\omega^2 d_{33}.\qquad\text{Equation 50}$$

Then the d'Alembert solution for the four waves generated by the transmitters are $$a_3^+(t-x/c)=-B\phi_3[t-(x-x_3-\delta)/c],\qquad\text{Equation 51}$$

$$a_3^-(t+x/c)=+B\phi_3[t+(x-x_3)/c],\qquad\text{Equation 52}$$

$$a_4^+(t-x/c) = -B\phi_4[t-(x-x_3-b-\delta)/c],\quad \text{Equation 53}$$

$$a_4^-(t+x/c) = +B\phi_4[t+(x-x_3-b)/c].\quad \text{Equation 54}$$

Next specify that the voltages are related to each other by $$\phi_3(t) = -\phi(t-b/c),\quad \text{Equation 55}$$

$$\phi_4(t) = +\phi(t).\quad \text{Equation 56}$$

In the region to the right of the transmitters where $x > x_4 + \delta$, the material acceleration is $$a^+[t-x/c] \equiv a_3^+ + a_4^+ = 2B\phi[t-(x-x_3-\delta+b)/c] - 2B\phi[t-\Delta t + \Delta \tau],\quad \text{Equation 57}$$

where one has used Eqs. 40, 51, and 55. In this result $\Delta t$ is given by Eq. 47, and $$\Delta \tau \equiv (x_3 - x_1 + \delta - b)/c.\quad \text{Equation 58}$$

Similarly one can show that to the left of the transmitters where $x < x_3$, the material acceleration is $$a^- \equiv a_3^- + a_4^- = 0.\quad \text{Equation 59}$$

One obtains this last result without using the periodicity condition of Eq. 40. This transmitter array only produces waves that propagates to the right.

The accelerometer and transmitter arrays can be combined to amplify right-traveling waves. To the right of both arrays we know that the right-traveling wave h exists where $$h[t-x/c] = f[t-x/c] + a^+[t-x/c].\quad \text{Equation 60}$$

Using Eqs. 46 and 57, one finds that $$h[t-x/c] = S(t-\Delta t)/2C + 2B\phi[t-\Delta t + \Delta \tau].\quad \text{Equation 61}$$

Now construct an amplifier by connecting the signal from the accelerometer array to the transmitters so that $$\phi(t) = S(t - \Delta \tau),\quad \text{Equation 62}$$

which yields $$h[t - x/c] = \left(\frac{1 + 4CB}{2C}\right) S(t - \Delta t).\quad \text{Equation 63}$$

Thus $$h[t-x/c] = (1+G)f[t-x/c],\quad \text{Equation 64}$$

where the gain G of the amplifier is given by $$G = 4CB.\quad \text{Equation 65}$$

One finds that the output of the amplifier is a right-traveling wave that is magnified and in phase with the original wave $f[t-x/c]$. As discussed above, when $G > 0$ the amplifier is inherently unstable when placed in a drill string; however, it is useful for canceling a wave. This is achieved by setting $$G = -1.\quad \text{Equation 66}$$

This version of the amplifier is referred to herein as a terminator.

Using a terminator introduces one additional complication. The responses of the PZT transducers depend on the frequency. (See Eq. 49.) All real systems as well as the above transient computations have a spectrum of frequencies. Thus, any high-frequency present in either the computation or the physical system will undergo a disproportionately large amplification. As the computation progresses or even as the physical device operates, these high-frequency components will grow without bound and eventually destabilize the system. However, this problem is resolved by placing a low-pass electronic filter between the accelerometer array and the transmitter array. The "roll off" in this filter only has to be greater than $1/\omega^2$ to counteract the effects of the PZT transducers.

In the physical world this can be accomplished with a simple 2-pole analog filter that introduces only minimal delay into the circuit that connects the accelerometer array to the transmitter array. This is important because every microsecond of additional delay forces one to increase the distance $x_3 - x_2$ another $5130 \times (1 \times 10^{-6}) \approx 5$ mm. In contrast, the filtering in the above transient calculations for the terminator is achieved with a finite-impulse-response filter. (See R. W. Hamming, *Digital Filters*, Prentice-Hall, Englewood Cliffs (1983).) The filter preferred above results in the much longer delay of 3 milliseconds. Thus, one has added approximately $5130 \times (3 \times 10^{-3}) \approx 15.4$ meters to the spacing between the arrays in the above transient calculations.

The schematic of an electrical circuit 30 for a terminator 38 is contained in FIG. 18. The filter/amplifier 32 contains the components that low-pass filter the output from the accelerometer array and amplify the signal by the gain $G = -1$. Also shown are delay components 36 to properly phase both the accelerometer 12 and transducer 14 arrays. At the junctions of the circuit, the : signs indicate the proper polarity of the signals. Notice that one can also apply a drive signal 34 to the circuit. This is the way one initiates the transient calculation for the terminator. While this circuit is one way of controlling the terminator, other circuits, particularly adaptive control circuits, can also be used.

The present invention may also be used in the following circumstance: Rotary drilling is accomplished by rotating a drill bit that is attached to the bottom of a drill string. The top of the drill string is attached to a kelly. Typically, the 45-foot-long kelly has either a square or a hexagonal cross section which mates with the rotary table mounted into the floor of the drill rig. By using the flats on the kelly, the rotary table engages and turns the kelly, drill string, and drill bit. The drill string is a periodic structure with passbands and stopbands. In contrast the kelly has a uniform cross-sectional area. Thus, the wave impedance of the kelly does not necessarily match the wave impedance of the drill string. This is another place where the quarter-wave transformer can be used to match the kelly impedance to that of the drill string. This has two advantages. First, it allows the communication signal to leave the drill string and enter the kelly. Second, it allows noise that is generated in the kelly to leave the kelly and enter the drill string. Field test measurements show that a majority of the noise in th e kelly is often generated directly in the kelly at the surface. Thus, the quarter-wave transformer will increase the communication signal level and decrease the noise level in the kelly. This will improve the signal to noise ratio by about 12 dB in energy. This is important because the kelly is the optimum location to capture the telemetry signal.

If a solid-steel quarter-wave transformer is used for the third passband, it must be about 80-inches long. Typically, adding a transformer of this length just under the kelly will interfere with ordinary drilling operations. However, if the transformer is made out of a material with a slower wave speed, its length can be reduced. It is also possible to create transformer out of a composite material by drilling holes or milling pockets into a steel cylinder or other suitable material and then filling the cavities with a heavy but compliant material such as lead. This will form a structure with a very low wave speed. By this method the length of a quarter-wave transform can be reduced to under 36 inches.

The impedance-matching methods discussed for waves in drill strings work for all types of wave energy. In particular they work for light and other electromagnetic waves. In microcircuits, electromagnetic signals propagate through periodic structures that are imprinted on a microchip. Usually the dominant wavelengths of the electrical signals in the microcircuit are much larger than the feature size of the imprinted circuit. This means the circuit is operating in the first passband of the periodic structure. One might think this means there is not an impedance matching problem. However, that is not true, and the methods discussed here can improve the energy transfer even at these long wavelengths. Moreover, as microchip clock rates increase, the operation of these circuits may move into the higher passbands in which case impedance matching may become even more important. At optical frequencies periodic devices are being built which already operate in the higher passbands. (Lens coatings are one example.) Here different types of glass are formed into a layered periodic structure that is often called a comb filter. Thus, the impedance-matching method we discuss here offers a method for getting light in and out of comb filters without creating reflections.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A system for transferring wave energy into or out of a periodic structure having a characteristic wave impedance profile at a prime frequency, the characteristic wave impedance profile comprising a real portion and an imaginary portion, said system comprising one or more energy transfer elements each having a wave impedance at the prime frequency approximately equal to the real portion of the characteristic wave impedance at one or more points on the periodic structure with said imaginary portion approximately equaling zero.

2. The system of claim 1 additionally comprising a terminator for cancellation of waves in the periodic structure.

3. The system of claim 1 wherein reflections of the wave energy at said prime frequency by joints between sections of the periodic structure are substantially eliminated.

4. The system of claim 1 wherein the periodic structure comprises a structure selected from the group consisting of optical structures, laminated slabs, semiconductor chips, coated lenses, pipes, and geologic formations.

5. The system of claim 1 wherein said periodic structure comprises a drill string comprising a plurality of sections of drill pipe of approximately equal length and a plurality of sections of tool-joint connections of approximately equal length.

6. The system of claim 5 wherein said one or more energy transfer elements comprise one or more repeaters.

7. The system of claim 5 wherein each of said one or more energy transfer elements is located approximately at a longitudinal midpoint of a section of drill pipe or tool joint connection.

8. The system of claim 5 additionally comprising one or more quarter-wave transformers at one or more points on the periodic structure with said imaginary portion approximately equaling zero to transmit waves across one or more discontinuities in the drill string.

9. The system of claim 5 wherein each of said one or more energy transfer elements comprises a cross-sectional area approximately equal to said real portion divided by a product of a mass density and a speed of sound of a section of the energy transfer element.

10. A stress wave communication system comprising:
a periodic structure for transmitting stress waves at a communications frequency; and
a terminator comprising an amplifier having a gain of negative one at the communications frequency.

11. The system of claim 10 wherein said periodic structure comprises a drill string comprising a plurality of sections of drill pipe and a plurality of sections of tool-joint connections.

12. The system of claim 10 wherein said terminator additionally comprises a filter to remove frequencies higher than a predetermined frequency above said communications frequency, said filter located between an accelerometer array and a transmitter array.

13. A stress wave communication system comprising:
a periodic structure having a characteristic wave impedance profile at a communications frequency, the characteristic wave impedance profile comprising a real portion and an imaginary portion; and
a quarter-wave transformer having an impedance approximately equal to a square root of a product of an impedance of a member connected to the periodic structure at the communications frequency and said real portion at a point at which said imaginary portion approximately equals zero.

14. The system of claim 13 wherein said periodic structure comprises one or more drill strings each comprising a plurality of sections of drill pipe of approximately equal length and a plurality of sections of tool-joint connections of approximately equal length.

15. The system of claim 13 wherein said transformer has a slower wave speed than said periodic structure.

16. A stress wave communication system comprising:
a periodic structure for transmitting stress waves at a communications frequency and having a characteristic wave impedance profile at the communications frequency, the characteristic wave impedance profile comprising a real portion and an imaginary portion; and
one or more repeaters each having a wave impedance at the communications frequency approximately equal to the real portion of the characteristic wave impedance at one or more points on the periodic structure with said imaginary portion approximately equaling zero.

17. The system of claim 16 wherein said periodic structure comprises a drill string comprising a plurality of sections of drill pipe of approximately equal length and a plurality of sections of tool-joint connections of approximately equal length.

18. The system of claim 17 wherein each of said one or more repeaters is located approximately at a longitudinal midpoint of a section of drill pipe or tool joint connection.

19. The system of claim 17 wherein each of said one or more repeaters comprises a cross-sectional area approximately equal to said real portion divided by a product of a mass density and a speed of sound of said repeaters.

20. A method for transferring wave energy into or out of a periodic structure having a characteristic wave impedance profile at a prime frequency, the characteristic wave impedance profile comprising a real portion and an imaginary portion, the method comprising the steps of:

locating one or more energy transfer elements each having a wave impedance at the prime frequency approximately equal to the real portion of the characteristic wave impedance at one or more points on the periodic structure with the imaginary portion approximately equaling zero; and employing the one or more energy transfer elements to transfer wave energy into or out of the periodic structure.

21. The method of claim 20 additionally comprising the step of providing a terminator for cancellation of waves in the periodic structure.

22. The method of claim 20 wherein reflections of the wave energy at the prime frequency by joints between sections of the periodic structure are substantially eliminated.

23. The method of claim 20 wherein in the locating step the periodic structure comprises a structure selected from the group consisting of optical structures, laminated slabs, semiconductor chips, coated lenses, pipes, and geologic formations.

24. The method of claim 20 wherein in the locating step the periodic structure comprises a drill string comprising a plurality of sections of drill pipe of approximately equal length and a plurality of sections of tool-joint connections of approximately equal length.

25. The method of claim 24 wherein in the locating step the one or more energy transfer elements comprise one or more repeaters.

26. The method of claim 24 wherein in the locating step each of the one or more energy transfer elements is located approximately at a longitudinal midpoint of a section of drill pipe or tool joint connection.

27. The method of claim 24 additionally comprising the step of providing one or more quarter-wave transformers at one or more points on the periodic structure with the imaginary portion approximately equaling zero to transmit waves across one or more discontinuities in the drill string.

28. The method of claim 24 wherein in the locating step each of the one or more energy transfer elements comprises a cross-sectional area approximately equal to the real portion divided by a product of a mass density and a speed of sound of a section of the energy transfer element.

29. A stress wave communication method comprising:

in a periodic structure transmitting stress waves at a communications frequency; and employing a terminator comprising an amplifier having a gain of negative one at the communications frequency.

30. The method of claim 29 wherein in the transmitting step the periodic structure comprises a drill string comprising a plurality of sections of drill pipe and a plurality of sections of tool-joint connections.

31. The method of claim 29 wherein in the employing step the terminator additionally comprises a filter to remove frequencies higher than a predetermined frequency above the communications frequency, the filter located between an accelerometer array and a transmitter array.

32. A stress wave communication method comprising:

providing a periodic structure having a characteristic wave impedance profile at a communications frequency, the characteristic wave impedance profile comprising a real portion and an imaginary portion; and employing a quarter-wave transformer having an impedance approximately equal to a square root of a product of an impedance of a member connected to the periodic structure at the communications frequency and the real portion at a point at which the imaginary portion approximately equals zero.

33. The method of claim 32 wherein in the providing step the periodic structure comprises one or more drill strings each comprising a plurality of sections of drill pipe of approximately equal length and a plurality of sections of tool-joint connections of approximately equal length.

34. The method of claim 32 wherein in the employing step the transformer has a slower wave speed than the periodic structure.

35. A stress wave communication method comprising:

providing a periodic structure for transmitting stress waves at a communications frequency and having a characteristic wave impedance profile at the communications frequency, the characteristic wave impedance profile comprising a real portion and an imaginary portion; and employing one or more repeaters each having a wave impedance at the communications frequency approximately equal to the real portion of the characteristic wave impedance one or more points on the periodic structure with the imaginary portion approximately equaling zero.

36. The method of claim 35 wherein in the providing step the periodic structure comprises a drill string comprising a plurality of sections of drill pipe of approximately equal length and a plurality of sections of tool-joint connections of approximately equal length.

37. The method of claim 36 wherein in the employing step each of the one or more repeaters is located approximately at a longitudinal midpoint of a section of drill pipe or tool joint connection.

38. The method of claim 36 wherein in the employing step each of the one or more repeaters comprises a cross-sectional area approximately equal to the real portion divided by a product of a mass density and a speed of sound of the repeaters.

39. A method of inserting wave energy into a periodic structure, the method comprising the steps of:

determining a point in a periodic structure having a characteristic wave impedance profile at a communications frequency, the characteristic wave impedance profile comprising a real portion and an imaginary portion, which point has an imaginary portion approximately equaling zero;

matching impedance of a wave energy insertion elements to the real portion at said point; and inserting at the point via the wave energy insertion elements wave energy at the communications frequency; and whereby reflections of the wave energy by the periodic structure are substantially minimized.

40. The method of claim 39 wherein in the inserting step the periodic structure comprises a structure selected from the group consisting of optical structures, laminated slabs, semiconductor chips, coated lenses, pipes, geologic formations, and drill strings.

* * * * *